US008345760B2

(12) United States Patent
Koyabu et al.

(10) Patent No.: US 8,345,760 B2
(45) Date of Patent: Jan. 1, 2013

(54) INFORMATION PROCESSING APPARATUS AND INFORMATION PROCESSING METHOD

(75) Inventors: Kyohei Koyabu, Kanagawa (JP); Shojiro Shibata, Kanagawa (JP); Shuji Tsunashima, Tokyo (JP); Keita Shirane, Kanagawa (JP); Ikko Tanaka, Kanagawa (JP); Takanori Takahashi, Kanagawa (JP)

(73) Assignee: Sony Corporation (JP)

( * ) Notice: Subject to any disclaimer, the term of this patent is extended or adjusted under 35 U.S.C. 154(b) by 1440 days.

(21) Appl. No.: 11/811,934

(22) Filed: Jun. 11, 2007

(65) Prior Publication Data

US 2008/0008251 A1  Jan. 10, 2008

(30) Foreign Application Priority Data

Jun. 13, 2006 (JP) ................ 2006-163591

(51) Int. Cl.
 *H04N 7/12* (2006.01)
(52) U.S. Cl. .......... 375/240.16; 375/240.28; 375/240.25
(58) Field of Classification Search ........................ None
See application file for complete search history.

(56) References Cited

U.S. PATENT DOCUMENTS

| 2006/0088278 A1 | 4/2006 | Koyabu et al. |
| 2006/0088286 A1 | 4/2006 | Shibata et al. |
| 2006/0093321 A1 | 5/2006 | Koyabu et al. |
| 2006/0093322 A1 | 5/2006 | Koyabu et al. |
| 2008/0056358 A1* | 3/2008 | Fuchie et al. ............ 375/240.12 |
| 2008/0056383 A1* | 3/2008 | Ueki et al. ............... 375/240.26 |
| 2011/0305273 A1* | 12/2011 | He et al. .................. 375/240.02 |

FOREIGN PATENT DOCUMENTS

| JP | 2000092371 | 3/2000 |
| JP | 2001-078145 A | 3/2001 |
| JP | 2002185846 | 6/2002 |
| JP | 2002-281458 A | 9/2002 |
| JP | 2003233101 | 8/2003 |
| JP | 2006-128830 A | 5/2006 |
| JP | 2006-157868 A | 6/2006 |
| JP | 2006-157873 A | 6/2006 |
| JP | 2006-157874 A | 6/2006 |
| JP | 2006-157875 A | 6/2006 |

OTHER PUBLICATIONS

Sony Blu-code (BAE-VX1000) Multi Codec HD Video Encoder—description brochure from Sony; year 2008.*
Joint Video Team (JVT) of ISO/IEC MPEG & ITU-T VCEG; (ISO/IEC JTC1/SC29/WG11 and ITU-T SG16 Q.6) JVT Meeting: Munich, Germany, Mar. 15-19, 2003.*

* cited by examiner

*Primary Examiner* — David Y Jung
(74) *Attorney, Agent, or Firm* — Lerner, David, Littenberg, Krumholz & Mentlik, LLP

(57) ABSTRACT

An information processing apparatus that decodes a coded stream includes a memory storing the coded stream, a decoder generating image data by decoding the coded stream stored in the memory, a memory-transfer controller controlling transfer so that the coded stream is transferred to the memory prior to timing for outputting the image data, and a decoding controller controlling decoding by the decoder so that, in the coded stream stored in the memory, a reference picture that is referred to in picture decoding is preferentially decoded.

20 Claims, 16 Drawing Sheets

INFORMATION PROCESSING APPARATUS AND INFORMATION PROCESSING METHOD

CROSS-REFERENCE TO RELATED APPLICATIONS

The present application claims priority from Japanese Patent Application No. JP 2006-163591, filed in the Japanese Patent Office on Jun. 13, 2006, the entire content of which is incorporated herein by reference.

BACKGROUND OF THE INVENTION

1. Field of the Invention

The present invention relates to information processing apparatuses and information processing methods, and, in particular, to an information processing apparatus and method suitable for use in decoding coded data.

2. Description of the Related Art

For example, a system (for example, Japanese Unexamined Patent Application Publication No. 2001-78145) is known in which, by installing, in a slot of a computer, a board with a playback apparatus (such as an MPEG (Moving Picture Experts Group) decoder) mounted thereon, image data stored in an HDD (hard disk drive) of the computer is decoded and played back by the playback apparatus.

This system is ordinarily formed so that a user can input a playback start instruction after specifying, on a screen of the computer, a playback point (picture data) of the image data stored in the HDD, which is to be played back as content data.

In this system of the related art, for example, after the playback start instruction is received from the user, picture data necessary for playing back the specified playback point is read from the HDD and is supplied to the playback apparatus.

SUMMARY OF THE INVENTION

In the system of the related art, it takes a time from input of the playback start instruction by the user until the start of playback since, after inputting the playback start instruction by the user until an image at the playback point is output, it is necessary to perform output of picture data from the HDD to the decoder, decoding of the picture data, and playback of the decoded data. In other words, the system of the related art has a bad response when performing random playback such as scrub playback. Accordingly, it is necessary to improve the response.

The present invention has been made in view of the foregoing circumstances, and it is desirable to improve a response of decoding.

According to an embodiment of the present invention, there is provided an information processing apparatus, for decoding a coded stream, including memory means for storing the coded stream, decoding means for generating image data by decoding the coded stream stored in the memory means, memory-transfer control means for controlling transfer so that the coded stream is transferred to the memory means prior to timing for outputting the image data, and decoding-control means for controlling decoding by the decoding means so that, in the coded stream stored in the memory means, a reference picture that is referred to in picture decoding is preferentially decoded.

The information processing apparatus may further include commanding means for commanding the timing for outputting the image data.

The information processing apparatus may further include determination means for determining transfer units of transfer to the memory means for the coded stream whose transfer is controlled by the memory-transfer control means.

In the information processing apparatus, the coded stream may include groups of pictures including B pictures, and, when a picture based on the image data whose output timing is commanded by the commanding means is included in a B picture that is decoded by referring to a picture included in a second group of pictures different from a first group of pictures including the picture based on the image data, the determination means may determine, as the transfer units of transfer to the memory means, the B picture that is decoded by referring to the second group of pictures, a reference picture that is referred to when the B picture is decoded, and the second group of pictures.

In the information processing apparatus, the coded stream may include groups of pictures including B pictures, and when each of a first group of pictures including a picture based on the image data whose output timing is commanded by the commanding means and a second group of pictures different from the first group of pictures is not transferred to the memory means, the determination means may determine, as the transfer units of transfer to the memory means, a B picture that is referred to by referring to a picture included in the second group of pictures, a reference picture that is referred to when the B picture is decoded, and the second group of pictures.

In the information processing apparatus, the coded stream may include groups of pictures including X frames, and, when a command by the commanding means represents forward output for an arrangement in the coded stream, and a picture based on the image data whose output timing is commanded by the commanding means is positioned within Y frames from the end of one group of pictures, where $0<Y<X$, the memory-transfer control means may control the transfer to the memory means for a group of pictures predicted to include a picture based on the image data, whose output timing is next commanded by the commanding means.

In the information processing apparatus, the coded stream may include groups of pictures including X frames, and, when a command to output the image data by the commanding means represents reverse output for an arrangement in the coded stream, and a picture based on the image data whose output timing is commanded by the commanding means is positioned within Z frames from the start of the group of pictures, where $0<Z<X$, the memory-transfer control means may control the transfer to the memory means for a group of pictures predicted to include a picture based on the image data, whose output timing is next commanded by the commanding means.

The memory-transfer control means may control the transfer to the memory means so that $Z>Y$.

The memory-transfer control means may control the transfer to the memory means so that the coded stream is transferred in predetermined transfer units with second timing earlier than first timing, and, when the transfer to the memory means is not controlled, may control the transfer to the memory means so that the coded stream is transferred in the predetermined transfer units.

In the information processing apparatus, priority for transfer of the coded stream which is controlled so that transfer is initiated with the first timing may be set by the memory-transfer control means to be higher than priority for transfer of the coded stream which is controlled so that transfer is initiated with the second timing.

In the information processing apparatus, the coded stream may include groups of pictures including X frames, and, in the first timing, a command to output the image data by the commanding means may represent a forward direction for an arrangement in the coded stream, and a picture based on the image data whose output timing is commanded by the commanding means may be positioned within Y frames from the end of one group of pictures, where 0<Y<X.

In the information processing apparatus, the coded stream may include groups of pictures including X frames, and, in the first timing, a command to output the image data by the commanding means may represent a reverse direction for an arrangement in the coded stream, and a picture based on the image data whose output timing is commanded by the commanding means may be positioned within Z frames from the start of the group of pictures, where 0<Z<X.

The information processing apparatus may further include buffering means for buffering the coded stream whose transfer is controlled by the memory-transfer control means before the coded stream is decoded, buffering-transfer control means for controlling transfer of the coded stream from the memory means to the buffering means, and control-signal output means for outputting, to the buffering-transfer control means, a control signal permitting transfer of the coded stream from the memory means to the buffering means.

In the information processing apparatus, the memory-transfer control means may controls the transfer so that the coded stream is transferred in predetermined transfer units with second timing earlier than predetermined first timing, and the control-signal output means may perform control so that the control signal is output to the buffering-transfer control means with the first timing.

In the information processing apparatus, priority for outputting the control signal to the buffering-transfer control means with the first timing may be higher than priority for transfer of the coded stream to the memory means with the second timing.

In the information processing apparatus, the coded stream may include groups of pictures including X frames, and, in the first timing, a command to output the image data by the commanding means may represent a forward direction for an arrangement in the coded stream, and a picture based on the image data whose output timing is commanded by the commanding means may be positioned within Y frames from the end of one group of pictures, where 0<Y<X.

In the information processing apparatus, the coded stream may include groups of pictures including X frames, and, in the first timing, a command to output the image data by the commanding means may represent a reverse direction for an arrangement in the coded stream, and a picture based on the image data whose output timing is commanded by the commanding means may be positioned within Z frames from the start of the group of pictures, where 0<Z<X.

In the information processing apparatus, the coded stream may include groups of pictures including X frames, and, in the second timing, a picture based on the image data whose output timing is commanded by the commanding means may be included in a group of pictures different from a group of pictures including a picture based on the image data, whose output timing is previously commanded by the commanding means.

In the information processing apparatus, the coded stream may be a stream coded in accordance with a Moving Picture Experts Group standard.

According to another embodiment of the present invention, there is provided an information processing method, for decoding a coded stream, including the steps of: storing the coded stream in memory means, generating image data by decoding the coded stream stored in the memory means, controlling transfer so that the coded stream is transferred to the memory means prior to timing for outputting the image data, and controlling decoding so that, in the coded stream stored in the memory means, a reference picture that is referred to in picture decoding is preferentially decoded.

According to an embodiment of the present invention, an output timing command, obtained after a predetermined frame in a coded stream is decoded, is predicted. Prior to the output timing command, transfer timing of the coded stream is determined in order for the coded stream to be supplied to a predetermined storage unit for decoding. In the coded stream stored in the storage unit, at least some of frames that are referred to when a different frame is decoded are preferentially decoded, and output timing of data generated by decoding is commanded.

A network represents a mechanism in which, with at least two apparatuses connected, information can be conveyed from one apparatus to another apparatus. Apparatuses that perform communication through the network may be separate, and may be internal blocks included in a single apparatus.

In addition, types of communication may include, not only wireless communication and wired communication, but also communication in which both wireless communication and wired communication are used, that is, communication in which wireless communication is performed in an interval and wired communication is performed in another interval. The types of communication may also include communication in which wired communication is used as communication from an apparatus to a different apparatus and wireless communication is used as communication from the different apparatus to the apparatus.

A playback apparatus may be an independent apparatus and may be a block for performing playback in each of a recording/playback apparatus and an editing apparatus.

As described above, according to an embodiment of the present invention, decoded data can be output. In particular, a coded stream is supplied for decoding prior to an output timing command, and, in the coded stream, at least some of frames that are referred to when a different frame is decoded are preferentially decoded. Thus, a playback response can be improved.

DESCRIPTION OF THE PREFERRED EMBODIMENTS

An embodiment of the present invention is described below with reference to the accompanying drawings.

Figure 1:
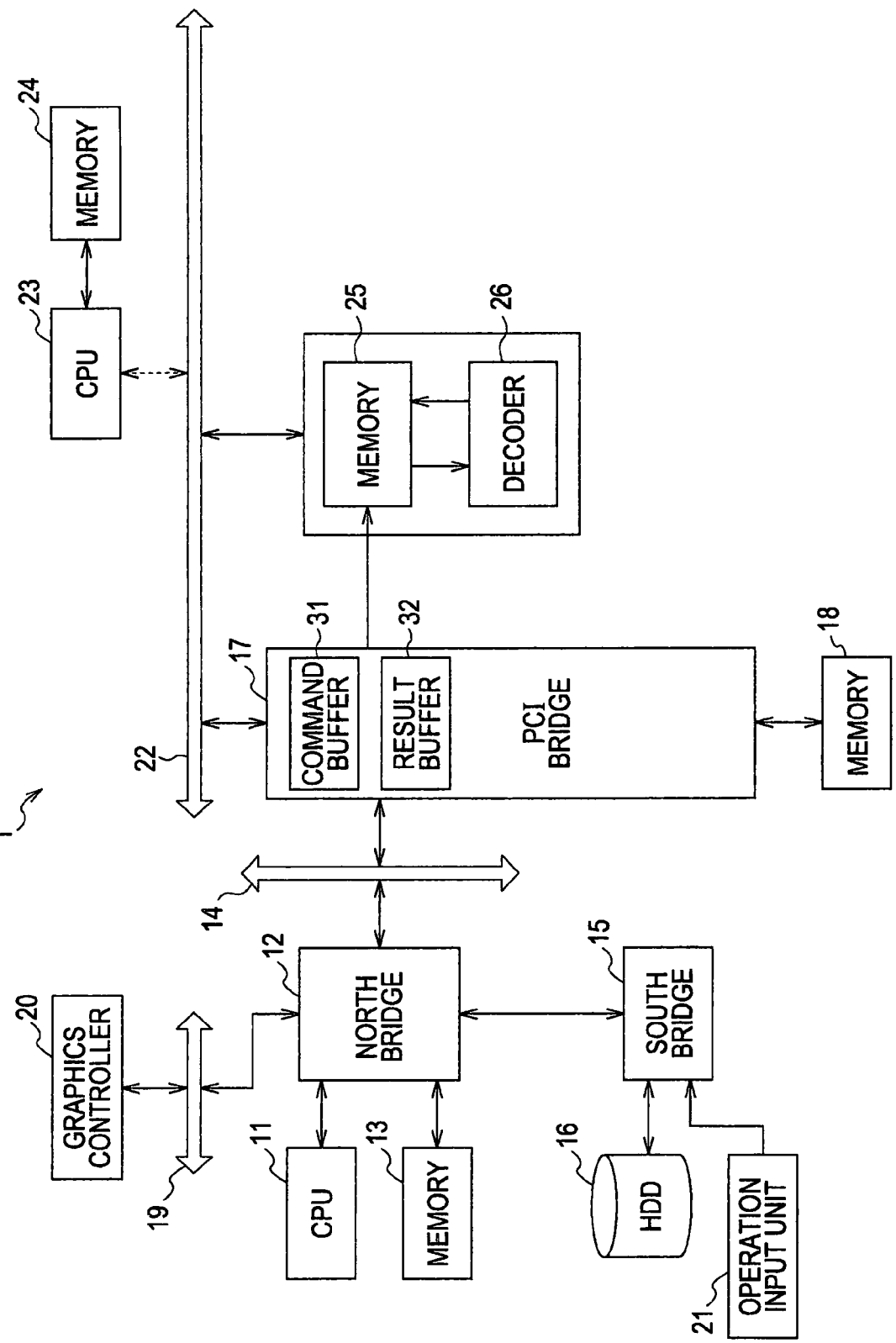
FIG. 1 is a block diagram showing the configuration of a playback apparatus.

FIG. 1 is a block diagram showing a hardware configuration of a playback apparatus 1.

A CPU (central processing unit) 11 is connected to a north bridge 12. For example, the CPU 11 controls processing such as reading of data stored in an HDD 16, schedules decoding executed by a CPU 23, and generates and outputs commands for commanding a start, alteration, or termination of processing such as decoding and control of display output. The north bridge 12 is connected to a PCI (peripheral component interconnect/interface) bus 14. For example, under the control of the CPU 11, the north bridge 12 is supplied with the data stored in the HDD 16, and supplies the data to a memory 18 through the PCI bus 14 and a PCI bridge 17. The north bridge 12 is also connected to a memory 13 and exchanges data necessary for processing by the CPU 11 with the memory 13.

The north bridge 12 is also connected to a memory 13 and exchanges data necessary for processing by the CPU 11 with the memory 13. A south bridge 15 controls data writing and reading. The south bridge 15 also receives a user's operation input supplied from an operation input unit 21, and supplies the input to the CPU 11 through the north bridge 12. The HDD 16 stores compression-coded stream data.

In addition, the north bridge 12 also connects to an AGP (accelerated graphics port) bus 19. By using the north bridge 12 and the AGP bus 19 to control a graphics controller 20, the CPU 11 can control display of a GUI (graphical user interface) for assisting the user in inputting operations. The graphics controller 20 is connected to an external display unit or external display device, which is not shown, and controls display processing of the external display unit or external display device under the control of the CPU 11.

The PCI bridge 17 includes therein a command buffer 31 and a result buffer 32, and connects to the memory 18, which buffers stream data read from the HDD 16 under the control of the CPU 11. Under the control of the CPU 11, the PCI bridge 17 can supply and store the stream data read from the HDD 16 in the memory 18. In addition, under the control of the CPU 23, the PCI bridge 17 can read stream data stored in the memory 18 and can supply the read stream data to a memory 25 connected to a decoder 26. The PCI bridge 17 also controls exchange of control signals corresponding to commands or results through the PCI bus 14 or a control bus 22.

A command can be written in the command buffer 31 by the CPU 11 through the north bridge 12 and the PCI bus 14, and a written command can be read from the command buffer 31 by the CPU 23 through the control bus 22. In addition, a result for a command can be written in the result buffer 32 by the CPU 23 through the control bus 22, and a written result can be read from the result buffer 32 through the north bridge 12 and the PCI bus 14.

Under the control of the PCI bridge 17, the memory 18 can store compression-coded stream data that is read from the HDD 16. The memory 18 is formed by, for example, an SDRAM (synchronous dynamic random access memory).

The CPU 20 reads the command written in the command buffer 31 of the PCI bridge 17 through the control bus 22, and controls, on the basis of the command, processes that are executed by the PCI bridge 17, the memory 18, the memory 25, and the decoder 26. A memory 24 stores data necessary for processing of the CPU 23.

Under the control of the CPU 23, the decoder 26 outputs an uncompressed video signal by decoding the supplied compression-coded stream data. The decoder 26 can decode one frame in a time sufficiently shorter than a display time for displaying one frame. The decoder 26 connects to the memory 22. The compression-coded stream data stored in the memory 18 after being supplied from the PCI bridge 17 can be temporarily stored in the memory 25, and can be supplied to the decoder 26. In addition, the uncompressed video signal obtained by decoding of the decoder 26 can be stored in the decoder 26. The decoder 26 may be provided as an independent device that is not included in the playback apparatus 1.

The playback apparatus 1 shown in FIG. 1 may be formed as a single apparatus or may be formed by a plurality of apparatuses. For example, by configuring, in the playback apparatus 1 shown in FIG. 1, the CPU 11, the north bridge 12, the memory 13, the south bridge 15, the HDD 16, the AGP bus 19, the graphics controller 20, and the operation input unit 21 so as to be entirely or partially be included in the configuration of a personal computer, and providing an expansion card, such as a PCI card or PCI-Express card, or expansion board, with functions of the PCI bus 14, the PCI bridge 17, the memory 18, the memory 22, the decoder 23, the memory 24, the memory 25, and the decoder 26, the personal computer can function as the playback apparatus 1 by mounting the expansion card or board to the personal computer. Alternatively, the playback apparatus 1 may be configured, with the above functional blocks further divided into a plurality of apparatuses.

Next, an operation of the playback apparatus 1 is described below.

The HDD 16 stores compressed video data that is obtained in a Long GOP format in MPEG.

On the basis of the user's operation input from the operation input unit 21, the CPU 11 controls processing for decoding the compression-coded stream for playback. For example, the user commands playback of a stream by viewing the screen shown in FIG. 2 that is displayed as a GUI on the display unit or device (not shown) by processing of the graphics controller 20.

Figure 2:
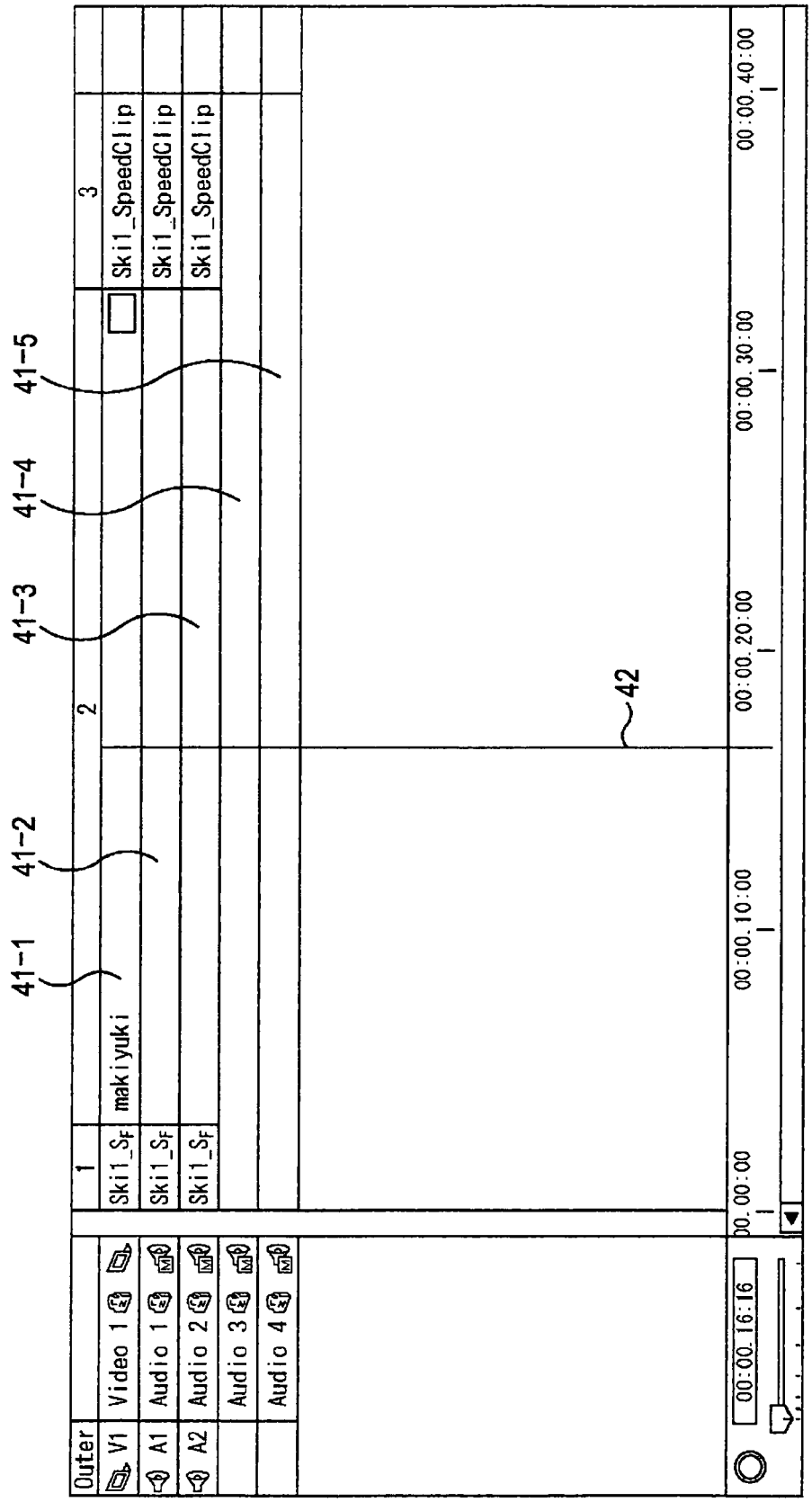
FIG. 2 is an illustration of a display screen for use in commanding playback.

On the screen shown in FIG. 2, streams that can be played back, that is, streams stored in the HDD 16, are displayed in a list form, with them represented by, for example, tags, icons, etc., and time lines 41-1 to 41-5 and display-frame-position specifying line 42 for commanding a playback position in a stream are displayed. When the user commands scrub playback of a desired stream, for example, by pasting a tag of a stream to be played back at a position among the time lines 41-1 to 41-5 with an input device such as a mouse, a stream whose scrub playback is to be performed can be specified, and the position of a frame to be displayed can be changed. When the display-frame-position specifying line 42 is slowly moved, frames are consecutively played back. When the display-frame-position specifying line 42 is fast moved, playback is performed at intervals of several frames, and the magnitude of intervals of frames for playback is determined on the basis of a moving speed of the display-frame-position specifying line 42. When a playback start position is commanded to be changed, the user may move the display-frame-position specifying line 42 faster than a predetermined speed. When reverse playback is commanded, the user may move the display-frame-position specifying line 42 in a reverse direction (the left direction in FIG. 2) at a desired speed.

Although FIG. 2 shows five time lines, that is, the time lines 41-1 to 41-5, obviously, the number of time lines is any value other than five.

On the basis of the user's operation input supplied from the operation input unit 21, the CPU 11 uses the north bridge 12 to control the south bridge 15 to read, from the HDD 16, compression-coded stream data specified by the user, and supplies and stores, in the memory 18, a portion of the data necessary for performing playback by decoding a frame at a user-specified playback position by using the north bridge 12, the PCI bus 14, and the PCI bridge 17. At this time, the stream data is basically transferred to the memory 18 in units of GOPs. Details of a method for determining a stream transfer unit are described later.

In addition, the CPU 11 uses the north bridge 12 and the PCI bus 14 to write, in the command buffer 31 of the PCI bridge 17, a GOP-transfer-completion command representing completion of transfer of data in a GOP to the memory 18, information representing a playback speed (including playback direction information), information representing a playback speed (including playback direction information).

The CPU 23 determines decoding and output (display) schedules of the compression-coded stream data on the basis of the commands written in the command buffer 31 of the PCI bridge 17. Specifically, the CPU 23 determines timing for transferring the compression-coded stream data from the memory 18 to the memory 25, timing for inputting the compression-coded stream data from the memory 25 to the decoder 26, timing for performing decoding for each frame, and output of a decoded picture, that is, display timing.

In other words, the CPU 23 controls the PCI bridge 17 to supply the compression-coded stream data stored in the memory 18 to the memory 25 and the decoder 26 on the basis of the determined schedule.

The CPU 23 controls the decoder 26 to decode the compression-coded stream data supplied through the memory 25. The decoder 26 generates and outputs uncompressed baseband image data by decoding the compression-coded stream data supplied.

Specifically, under the control of the CPU 23, the decoder 26 preferentially decodes I and P pictures of a GOP supplied to the memory 22, and stores the obtained uncompressed baseband image data in the memory 25. Specifically, when the CPU 11 supplies the CPU 23 with a frame display command, if the memory 25 stores uncompressed baseband image data to be used for display, the CPU 23 controls the memory 25 to output the stored data. If the memory 25 stores no uncompressed baseband image data to be used for display, the CPU 23 controls the decoder 26 so that, by using, as a reference image, uncompressed baseband image data stored in the memory 25, a frame to be displayed is decoded and uncompressed baseband image data is generated and output.

Since the decoder 26 can decode one frame in a time sufficiently shorter than a display time for displaying one frame, while processing for decoding a frame to be displayed is not performed, the decoder 26 preferentially decodes I and P pictures of the GOP stored in the memory 25 and stores the obtained uncompressed baseband image data in the memory 25. When the display command is transmitted from the CPU 11, if a frame to be displayed, itself, or a reference image for a frame to be displayed is already stored in the memory 25, a baseband image signal stored in the memory 25 can be output and can be used as a reference image. Therefore, compared with a case in which decoding priority is not given depending on each picture, high speed decoding can be performed, particularly in a display start frame.

That is, in the playback apparatus 1, data for one GOP can be transferred prior to a display command. Thus, at least some of I and P pictures included in the transferred GOP can preferentially be decoded. When a predetermined frame needs to be displayed, a command to display the frame is generated, and I and P pictures decoded beforehand are used to display the predetermined frame. Thus, a time from generation of the command to display the frame until the end of decoding can be reduced, thus improving a response.

Accordingly, when the display-frame-position specifying line 42 is commanded to be move at high speed, and frame display is performed at one frame per GOP, compared with the case of transferring all the frames in the GOP, it is more efficient to transfer only a minimum number of frames for decoding a frame to be played back. However, there may be a case in which, after that, consecutive playback is commanded and a corresponding GOP and other data are necessary. In this case, if only a minimum amount of data (i.e., a frame to be displayed and data necessary for decoding the frame) has been transferred, it becomes necessary to transfer additional data for the insufficiency. As described above, in the case of control in which only minimum frames are transferred in high speed display and additional data is transferred if necessary, data management is complicated. Accordingly, the CPU 11 controls frame transfer to be performed basically in units of GOPs.

In other words, after the CPU 11 controls transfer of a GOP including a frame to be displayed, the CPU 11 transmits a display command to specify the frame to be displayed.

Next, the functions of the CPU 11 are described below with reference to the functional block diagram shown in FIG. 3.

The CPU 11 has functions including an operation input acquiring unit 61, a transferring GOP determining unit 62, a transfer-unit determining unit 63, a GOP transfer timing control unit 64, a transfer-completion-command sending unit 65, a result acquiring unit 66, and a display command sending unit 67.

The operation input acquiring unit 61 acquires a user's operation input supplied from the operation input unit (not shown) through the south bridge 15 and the north bridge 12. The operation input acquiring unit 61 supplies corresponding operation input information to the transferring GOP determining unit 62 or the transfer-unit determining unit 63, if necessary.

On the basis of the operation input supplied from the operation input acquiring unit 61, the transferring GOP determining unit 63 schedules frame display order and finds a frame to be output for playback, determines a GOP to be transferred to the memory 18, and reports the GOP to the transfer-unit determining unit 62 and the GOP transfer timing control unit 64.

On the basis of the operation input supplied from the operation input acquiring unit 61 and information which represents the GOP to be transferred and which is reported from the transferring GOP determining unit 62, the transfer-unit determining unit 63 determines a data transfer unit for the GOP to be transferred.

Figure 4:
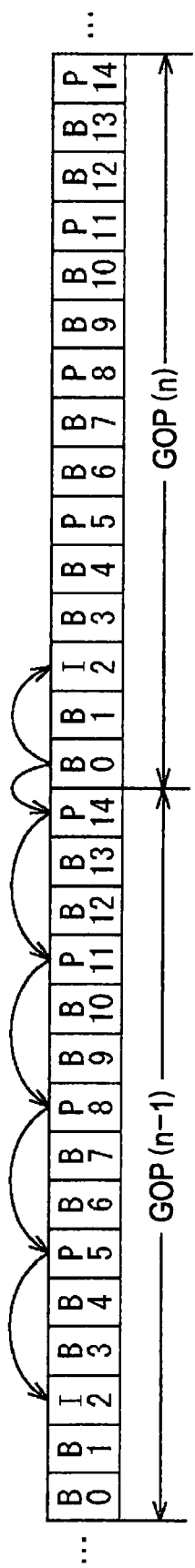
FIG. 4 is an illustration of a reference image.

As described above, frame data transfer is performed basically in units of GOPs. However, when frames to be displayed are B0 and B1 at the start of a GOP, as shown in FIG. 4, exceptional processing is necessary in order to refer to frames in a previous GOP.

Figure 5:
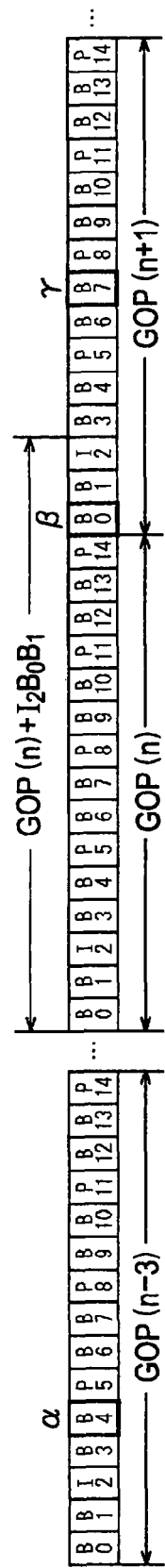
FIG. 5 is an illustration of a GOP transfer unit.

In particular, when playback frames are not continuous, for example, in a case in which, as moved from the position denoted by α in FIG. 5 to the position denoted by β in FIG. 5, the display-frame-position specifying line 42 is fast moved, if complete transfer in units of GOPs is executed, transfer for two GOPs, GOP(n) and GOP(n+1), needs to be performed. However, in scrub playback by using the GUI screen described with reference to FIG. 2, fast moving of the playback position is frequently performed. Accordingly, in a state with the display-frame-position specifying line 42 fast moved on the GUI screen described with reference to FIG. 2, there is a high possibility that what is displayed next to the frame denoted by β in FIG. 5 may be a frame included in a GOP different from GOP(n+1), and, in such a case, transfer of all the data of GOP(n+1) is wasteful.

Therefore, when the frames to be displayed are B0 and B1 at the start of a GOP, in exceptional processing, the CPU 11 controls data transfer so that data transfer is performed in a form in which I2, B0, and B1 in a GOP including the frames to be displayed are added to a previous GOP from the GOP including the frames to be displayed. In addition, after data transfer is performed, with I2, B0, and B1 added to the previous GOP, and the frame denoted by β is displayed, normal playback is commanded. When a movement of the display-frame-position specifying line 42 is less, and a frame included in GOP(n+1), for example, the frame denoted by γ in FIG. 5, is commanded to be displayed, if GOP(n+1) is transferred as usual, the data transfer produces only redundant portions I2, B0, and B1, so that control does not become complicated. This reduces redundancy of data transfer, thus improving data transfer efficiency.

The GOP transfer timing control unit 64 controls timing of GOP transfer to the memory 18 by using an FIFO queue if necessary to manage GOPs stored in the memory 18. Details of control of the transfer timing are described later.

The transfer-completion-command sending unit 65 sends a transfer-completion command to the command buffer 31 of the PCI bridge 17 through the north bridge 12 and the PCI bus 14. Details of control of timing for sending the transfer-completion command are described later.

The result acquiring unit 66 acquires a result responsive to a command from the result buffer 32 of the PCI bridge 17 through the north bridge 12 and the PCI bus 14.

The display command sending unit 67 sends a display command to the command buffer 31 of the PCI bridge 17 through the north bridge 12 and the PCI bus 14. Details of control of timing for sending the display command are described later.

The CPU 23 has functions including a command acquiring unit 101, an inter-memory transfer control unit 102, a decoding scheduling unit 103, a decoding control unit 104, and a result sending unit 105.

The command acquiring unit 101 acquires, through a control bus 22, a command stored in the command buffer 31 of the PCI bridge 17 after being sent from the transfer-completion-command sending unit 65 or the display command sending unit 67.

The inter-memory transfer control unit 102 controls transfer, to the memory 25, of GOPs transferred to the memory 18 on the basis of the transfer-completion command and display command acquired by the command acquiring unit 101.

The decoding scheduling unit 103 determines a decoding schedule for decoding frames included in each GOP whose transfer to the memory 22 is controlled by the inter-memory transfer control unit 72 on the basis of the transfer-completion command and display command acquired by the command acquiring unit 101. By using a time in which decoding necessary for display is not performed, the decoding scheduling unit 103 schedules decoding so that, among the frames stored in the memory 25, I and P pictures are preferentially decoded. In addition, by using the I and P pictures stored in the memory 25 after being decoded beforehand, the decoding scheduling unit 103 schedules decoding so that baseband image data of a frame whose display is commanded can rapidly be output.

The decoding control unit 104 controls decoding of the decoder 26 on the basis of the decoding schedule obtained by the decoding scheduling unit 103.

The result sending unit 105 sends results responsive to the transfer-completion command and display command acquired by the command acquiring unit 101 to the result buffer 32 of the PCI bridge 17 through the control bus 22.

Figure 3:
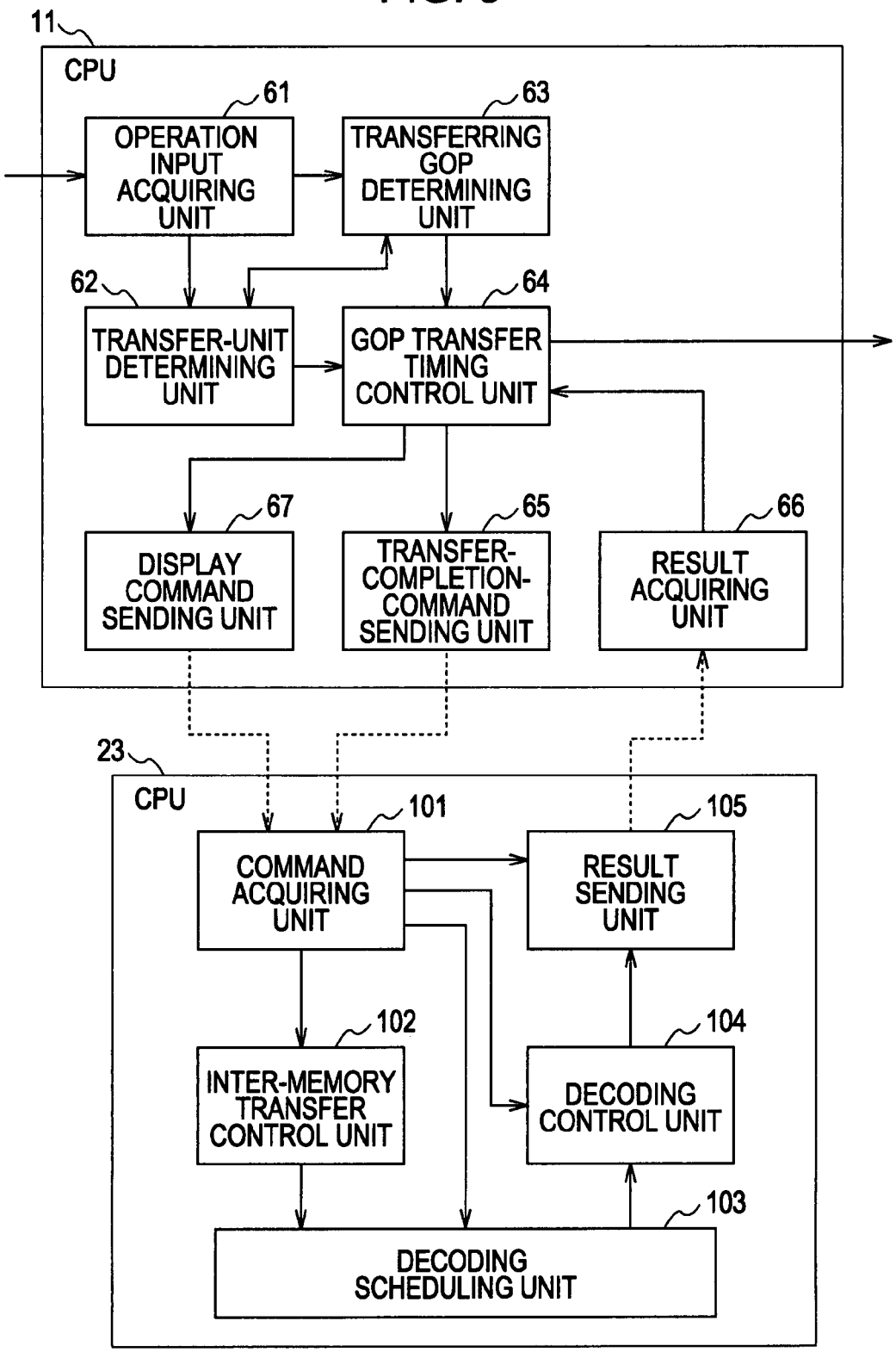
FIG. 3 is a functional block diagram illustrating CPU functions.

Next, GOP transfer timing control executed by the GOP transfer timing control unit 64 in FIG. 3, transfer-completion-command sending-timing control executed by the transfer-completion-command sending unit 65 in FIG. 3, and display-command sending-timing control executed by the display command sending unit 67 in FIG. 3 are fully described below.

In the playback apparatus 1, after being transferred to the memory 18 under the control of the CPU 11, the frame data stored in the HDD 16 can be transferred and decoded under the control of the CPU 23. In this manner, instead of directly transferring the frame data stored in the HDD 16 to the memory 25, by temporarily transferring the frame data to the memory 18, even if the amount of data capable of being stored in the memory 25 is small, decoding can be prevented from being delayed as much as possible.

In a case in which the amount of data capable of being stored in the memory 25 is, for example, five GOPs, when considering reverse of the playback direction in playback such as transient playback in which transient playback in which forward playback and backward playback are consecutively commanded in a short interval, it is preferable that unused data be not supplied as much as possible. However, data reading from the HDD 16 is less stable than that from each memory, and, in addition, the PCI bus 14 is not occupied only by GOP data transfer, so that an interruption from a different device, etc., may occur. Due to the above facts, in cases such as when the playback seed is changed, when the playback direction is reversed, and when the playback start position is changed, the frame data stored in the HDD 16 may not be directly, stably transferred to the memory 25 at high speed.

Accordingly, by using the memory 18 as an intermediate buffer since the memory 18 is free from an external interruption and is expected to stably transfer data to the memory 25, even if the amount of data capable of being stored in the memory 25 is small, stable decoding can be performed.

When the GOP including the frame commanded to be currently displayed has not been transferred yet, and, when transfer of a corresponding GOP is not only controlled but also it is determined on the basis of circumstances in the past that playback is consecutive, the GOP transfer timing control unit 64 may control data transfer so that a GOP likely to be next transferred can be transferred in advance depending on the playback direction.

Specifically, when the GOP transfer timing control unit 64 determines that consecutive playback is executed in the forward direction, the GOP transfer timing control unit 64 initiates transfer of the next GOP a predetermined period (for example, for five frames) earlier than commanding of display of the frame temporally included in the next GOP. In addition, similarly, when it is determined that reverse playback is consecutively executed, the GOP transfer timing control unit 64 initiates transfer of a forward GOP a predetermined earlier (for example, eight frames) than commanding display of a frame included in a temporally forward GOP.

Here, in forward playback and reverse playback, regarding timing that a GOP predicted to be next displayed is transferred in advance, the GOP may be transferred in advance only in an identical predetermined period. it is more preferable to transfer a GOP predicted to be next displayed a more time earlier in the case of reverse playback in which a frame having more reference images is earlier displayed is likely to be played back than in the case of forward playback.

Accordingly, by preferentially decoding at least some pictures among I and P pictures in the next GOP predicted to be commanded to be displayed, the decoder 26 can store obtained baseband image signals in the memory 25 prior to commanding display of these images and an image obtained by decoding these images. Therefore, decoding of an image commanded to be displayed can be executed faster compared with a case in which reference image frames for the image are sequentially decoded.

When non-consecutive playback is commanded, such as a case in which consecutive playback is not performed, that is, a case in which such very high speed playback that one frame is not displayed for one GOP, if the next GOP is transferred beforehand in the playback direction, the transfer is likely to be unnecessary. Thus, in this case, earlier transfer is not performed.

As described above, in order for the GOP transfer timing control unit 64 to control GOP transfer, it is necessary to recognize GOPs currently stored in the memory 18. Accordingly, the GOP transfer timing control unit 64 manages the GOPs stored in the memory 18 by using, for example, a FIFO queue.

In addition, as described above, in the playback apparatus 1, under the control of the GOP transfer timing control unit 64 in the CPU 11, after being transferred to the memory 18, the frame data stored in the HDD 16 is transferred to the memory 25 and is decoded. Since transfer is performed twice as described above, data transfer may be delayed.

Accordingly, with the memory 18 set to have a data size sufficiently greater than that of the memory 25, the GOP transfer timing control unit 64 uses, as second timing different from first timing that is an intermediate point (within 5 frames from the end of a GOP in the case of forward playback and within 8 frames from the start of a GOP in the case of reverse playback) in a GOP including a frame being played back, a GOP-change point of the GOP including the frame being played back, and transfers a GOP likely to be next transferred to the memory 18 in advance. When the GOP likely to be next transferred has not been transferred yet with the first timing that is an intermediate point of the GOP including the frame being played back, the GOP transfer timing control unit 64 initiates transfer of the GOP similarly to the above-described case.

In addition, at this time, even if transfer of the GOP likely to be next played back is initiated with the second timing, or even if transfer of the GOP likely to be next played back is initiated with the first timing, it is preferable that the transfer-completion command be transmitted with the first timing because data is prevented from being transmitted in advance to the memory 25 more than necessary.

This stabilizes data transfer and improves a response to a display command. For example, even if a GOP that is transferred to the memory 18 in advance is not played back due to a reason such as a change in transfer direction or a change in transfer speed, when no transfer-completion command is transmitted, the memory 25 can effectively be used since the GOP is not transferred to the memory 25.

In addition, compared with processing for transmitting a command and processing for transferring a GOP likely to be played back next to a GOP including a currently played-back frame, it is further preferable that, at a GOP change point, priority for processing for transmitting a GOP likely to be subsequently transferred be lowered.

In other words, compared with the processing for transmitting a command, such as a display command, and the processing for transferring a GOP likely to be played back next to a GOP including a currently played-back frame, the processing for transferring data in advance at the GOP change point has no urgency since, in the processing, data likely to be used is transferred beforehand.

Thus, by giving priority, efficiency of data transfer, such as command transmission, can be improved without deteriorating processing necessary for displaying video. In addition, equivalently to the case of the command transmission, by giving high priority to each of the data transfer processing necessary for display and the processing for transferring the GOP likely to be played back next to the GOP including the currently played-back frame, if it is necessary to transfer another GOP having higher urgency in the middle of transferring only data at the GOP change point, by raising the priority of the transfer, a response of transfer of a necessary GOP can be prevented from being delayed.

Next, a first process of the CPU 11 is described below with reference to the flowchart shown in FIG. 6.

In step S1, the operation input acquiring unit 61 in the CPU 11 receives a user's operation input supplied from the operation input unit 21 through the south bridge 15 and the north bridge 12, and supplies the operation input to the transferring GOP determining unit 62 and the transfer-unit determining unit 63.

In step S2, the transferring GOP determining unit 62 schedules a frame display order. In step S3, the transferring GOP determining unit 62 specifies a frame to be displayed, whereby a GOP to be transferred to the memory 18 is determined. The transferring GOP determining unit 62 reports the specified frame to the transfer-unit determining unit 63 and the GOP transfer timing control unit 64.

Figure 8:
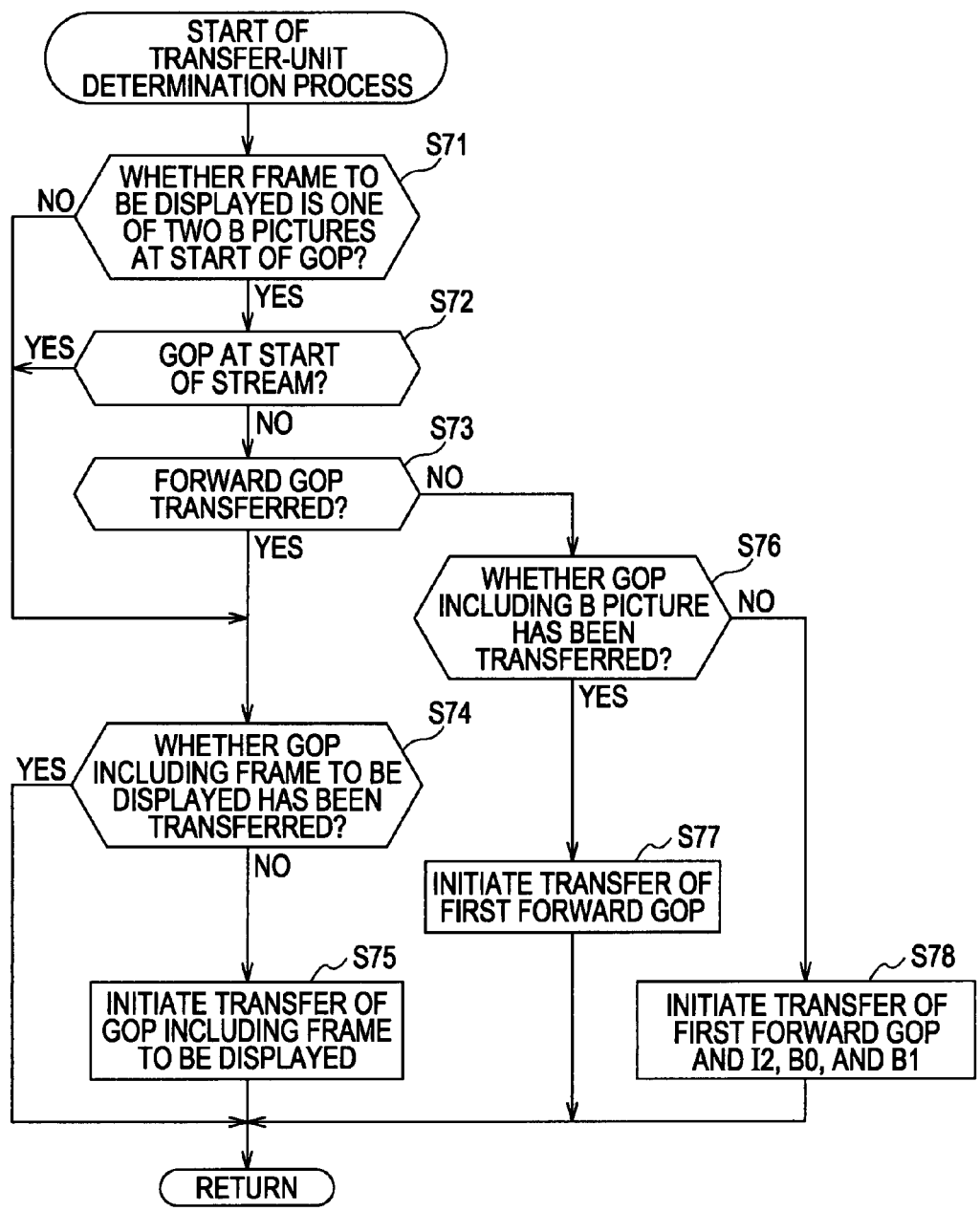
FIG. 8 is a flowchart illustrating a transfer-unit determination process.

In step S4, a transfer-unit determination process, which is described with reference to FIG. 8, is executed.

Figure 9:
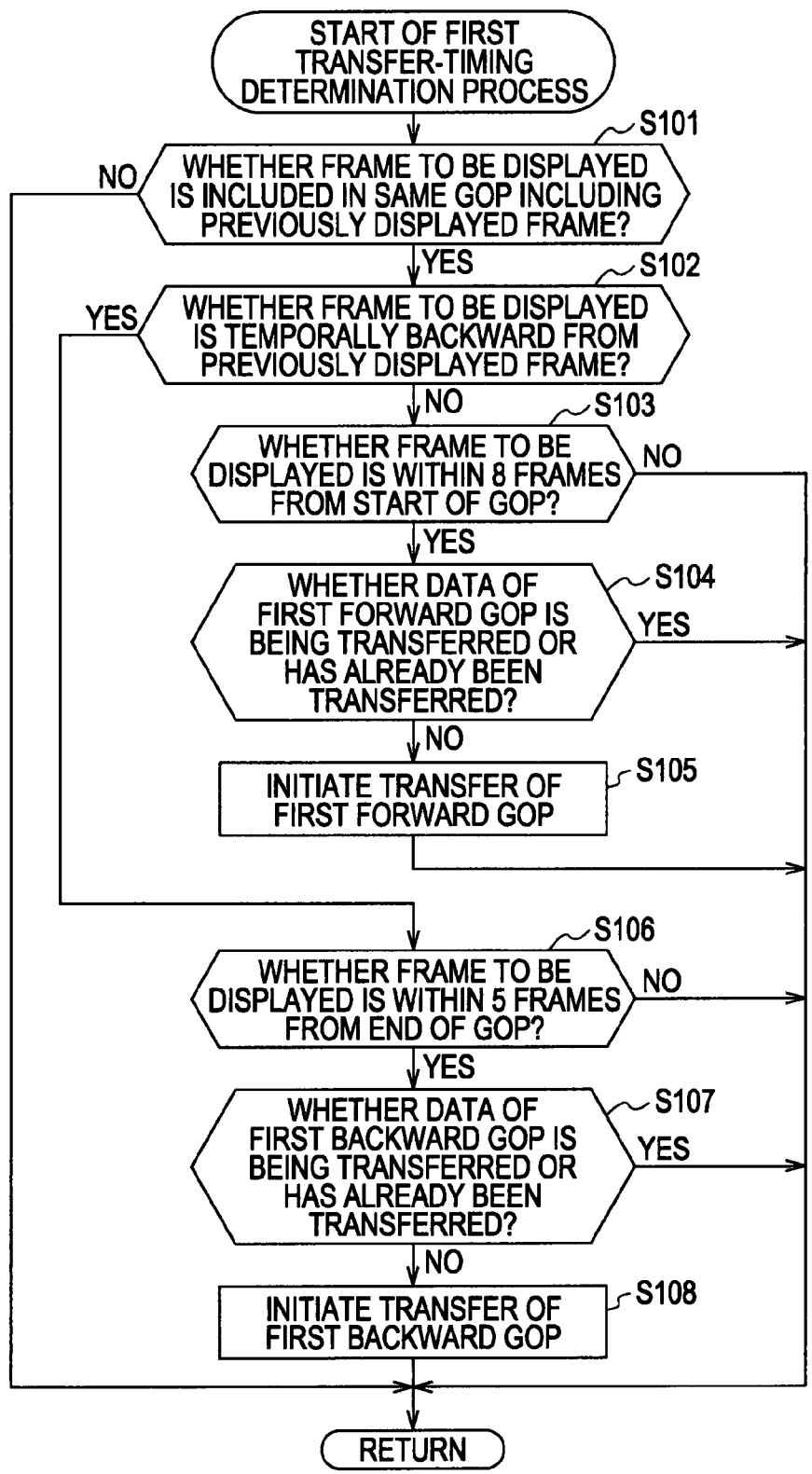
FIG. 9 is a flowchart illustrating a first transfer-timing determination process.
Figure 10:
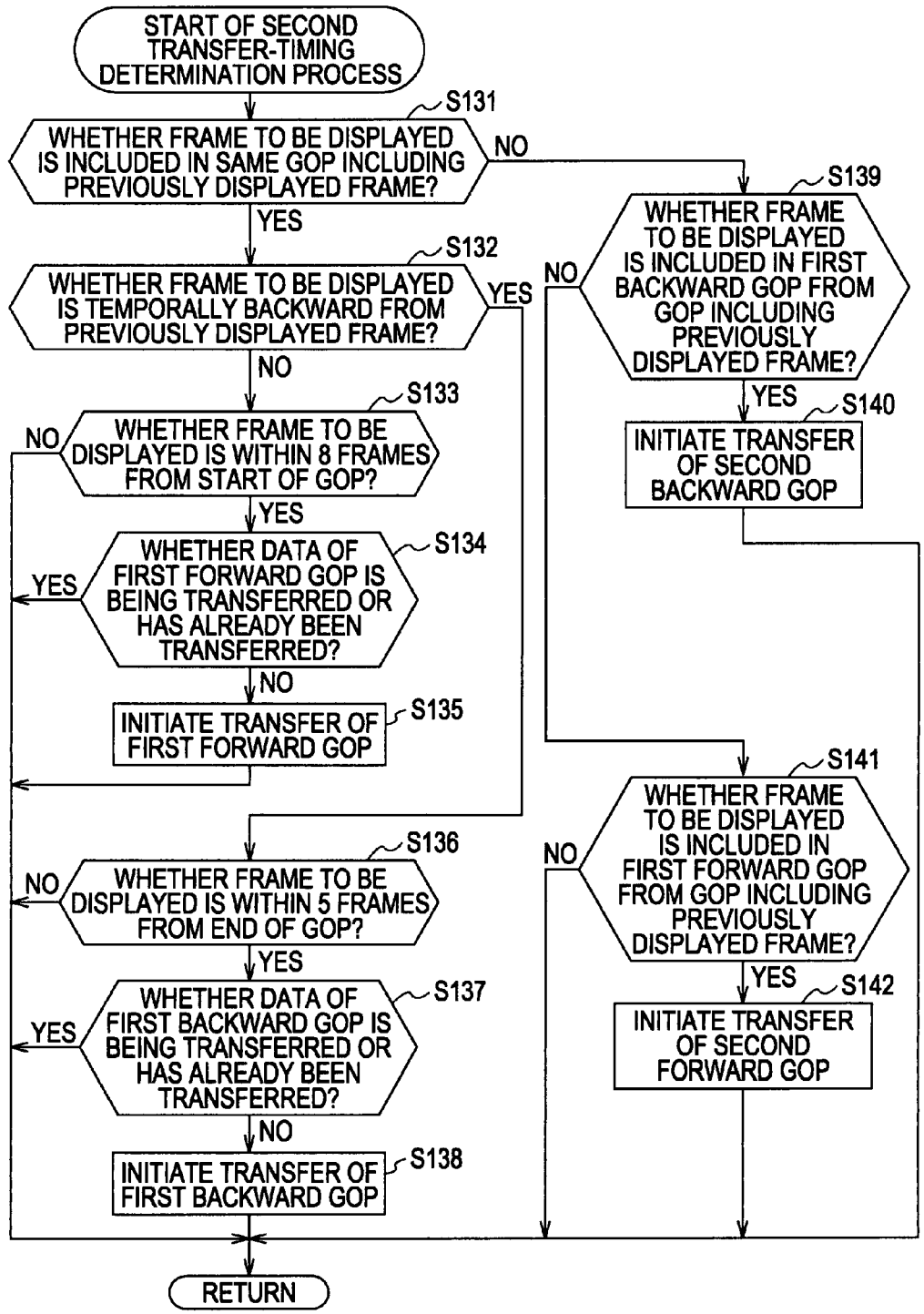
FIG. 10 is a flowchart illustrating a second transfer-timing determination process.

In step S5, a transfer-timing determination process, which is described with reference to FIG. 9 or 10, is executed.

In step S6, the GOP transfer timing control unit 64 determines whether transfer of one GOP has already been completed.

If, in step S6, it is determined that the transfer of one GOP has already been completed, in step S7, the GOP transfer timing control unit 64 commands the transfer-completion-command sending unit 65 to transmit a GOP-transfer-completion command. The transfer-completion-command sending unit 65 transmits the transfer-completion command to the command buffer 31 of the PCI bridge 17 through the north bridge 12 and the PCI bus 14.

If, in step S6, it is determined that it is determined that the transfer of one GOP has not already been completed, or after step S7 finishes, in step S8, on the basis of a signal supplied from the result acquiring unit 66, the GOP transfer timing control unit 64 determines whether a result of transfer termination of a GOP including a frame to be next displayed is acquired or has already been acquired from the result buffer 32 through the north bridge 12 and the PCI bus 14. If, in step S8, it is determined that the result of the transfer termination of the GOP including the frame to be next displayed is not acquired or has not already been acquired, step S8 is repeatedly performed until it is determined that the result of the transfer termination of the GOP including the frame to be next displayed is acquired or has already been acquired.

If, in step S8, it is determined that the result of the transfer termination of the GOP including the frame to be next displayed is acquired or has already been acquired, in step S9, the GOP transfer timing control unit 64 commands the display command sending unit 67 to transmit a display command to display a frame to be next displayed. The display command sending unit 67 transmits the display command to the command buffer 31 of the PCI bridge 17 through the north bridge 12 and the PCI bus 14.

In step S10, on the basis of a signal, representing the operation input, supplied from the operation input acquiring unit 61, the transfer-unit determining unit 63 determines whether an operation including an alteration in frame display order, such as a change in position of the display-frame-position specifying line 42 described with reference to FIG. 2, or a change in stream to be displayed, has been input from the user. If, in step S10, it is determined that the operation including an alteration in frame display order has been input, the process returns to step S2 and the subsequent steps are repeatedly performed.

If, in step S10, it is determined that the operation including an alteration in frame display order has not been input, in step S11, on the basis of the signal, representing the operation input, supplied from the operation input acquiring unit 61, the transfer-unit determining unit 63 determines whether display is to be finished. If, in step S11, it is determined that the display is not to be finished, the process returns to step S3 and the subsequent steps are repeatedly performed. If, in step S11, it is determined that the display is to be finished, the process finishes.

As described above, in the CPU 11, on the basis of a user's operation input, a frame display order is determined. A GOP transfer unit and transfer timing are determined so that I and P pictures of a corresponding GOP can be decoded prior to transmission of a display command, and a transfer-completion command is transmitted at the time the transfer is completed. After that, a display command is transmitted. Thus, when the display command is transmitted, there is a high possibility that I and P pictures of the GOP has already been decoded, so that a display response to the display command can be improved.

Figure 6:
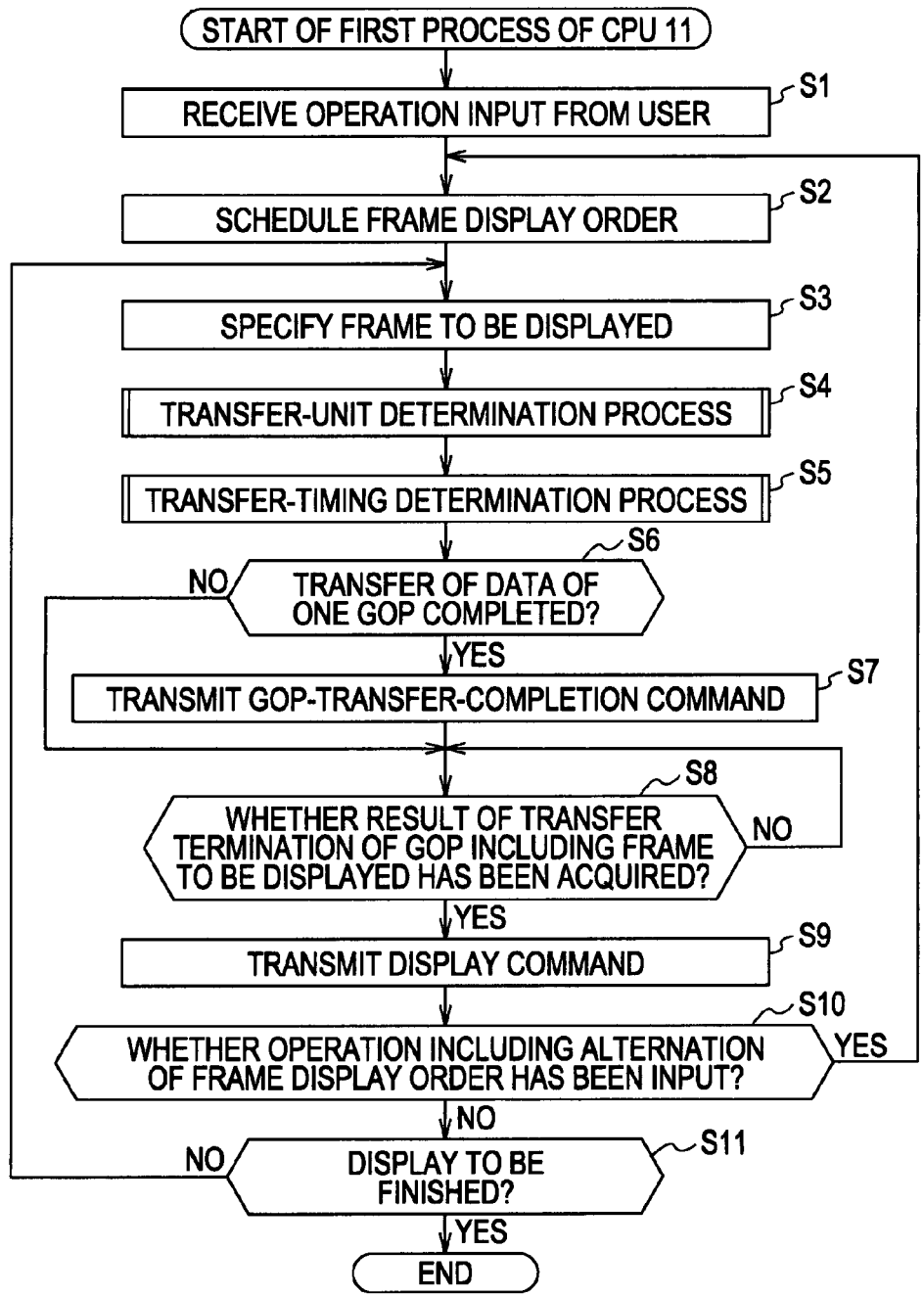
FIG. 6 is a flowchart illustrating a first process of the CPU 11 shown in FIG. 1.
Figure 7:
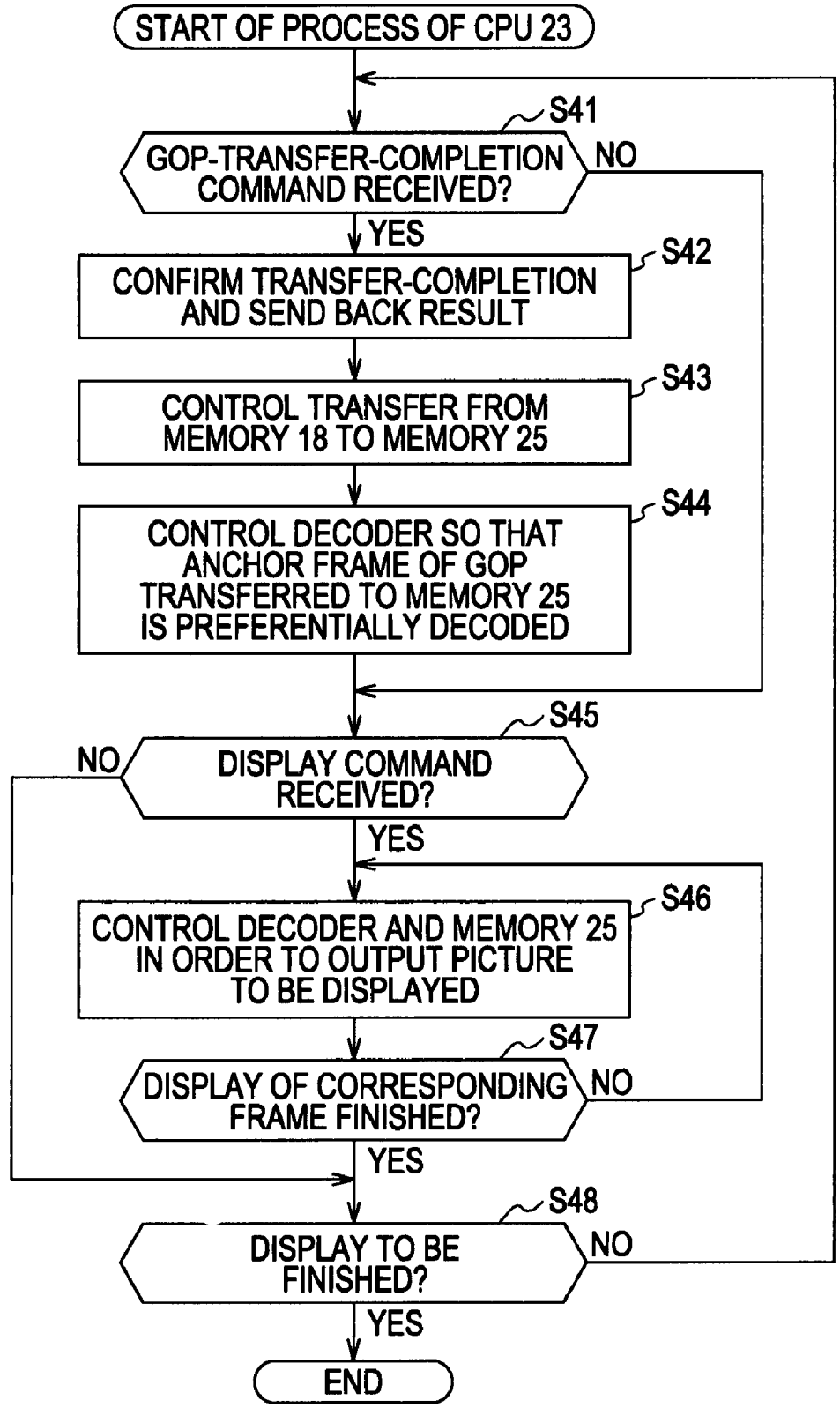
FIG. 7 is a flowchart a process of the CPU 23 shown in FIG. 1.

Next, a process of the CPU 23 that is executed in parallel with the first process of the CPU 11 described with reference to FIG. 6 is described below with reference to the flowchart shown in FIG. 7.

In step S41, by referring to the command buffer 31 of the PCI bridge 17 through the memory 22, the inter-memory transfer control unit 102 in the CPU 23 determines whether the transfer-completion command has been received. If, in step S41, it is determined that the transfer-completion command has not been received, the process proceeds to step S45, which is described later.

If, in step S41, it is determined that the transfer-completion command has been received, in step S42, the command acquiring unit 101 reports reception of the transfer-completion command to the inter-memory transfer control unit 102 and the result sending unit 105. The inter-memory transfer control unit 102 confirms completion of the GOP from the HDD 16 to the memory 18. The result sending unit 105 sends back a result to the transfer-completion command to the result buffer 32 of the PCI bridge 17 through the control bus 22.

In step S43, the inter-memory transfer control unit 102 controls GOP transfer from the memory 18 to the memory 25. That is, the inter-memory transfer control unit 102 controls the GOP transfer from the memory 18 to the memory 25 on the basis of timing that the transfer-completion command is received from the CPU 11 instead of timing that the GOP transfer to the memory 18 is completed.

In step S44, the decoding scheduling unit 103 schedules decoding so that an anchor frame of the GOP transferred to the memory 25 is preferentially decoded, and reports the decoding schedule to the decoding control unit 104. The decoding control unit 104 controls decoding by the decoder 26 on the basis of the decoding schedule obtained by the decoding scheduling unit 103.

If, it is determined that the transfer-completion command has not been received, or after step S44 finishes, in step S45, by referring to the command buffer 31 of the PCI bridge 17 through the control bus 22, the command acquiring unit 101 determines whether the display command has been received. If, in step S45, it is determined that the display command has not been received, the process proceeds to step S48.

If, in step S45, it is determined that the display command has been received, in step S46, the decoding control unit 104 controls the decoder 26 and the memory 25 in order to output a picture.

Specifically, when a frame commanded to be displayed is, for example, an I picture or P picture, it is detected whether baseband image data obtained by decoding is stored in the memory 25. If the baseband image data is stored in the memory 25, the stored baseband image data is output. In addition, when a frame commanded to be displayed is, for example, a B picture, it is detected whether reference image data necessary for decoding the B picture is stored in the memory 25. If the reference image data is stored in the memory 25, the stored reference image data is used to decode a B picture to be output.

In step S47, the decoding control unit 104 determines whether display of a corresponding frame has finished. If, in step S47, it is determined that the display of the frame has not finished, the process returns to step S46 and the subsequent steps are repeatedly performed.

If, in step S45, it is determined that the display command has not been received, or, in step S47, it is determined that the display of the frame has finished, in step S48, by referring to the command buffer 31 of the PCI bridge 17 through the control bus 22, the command acquiring unit 101 determines whether display is to be finished. If, in step S48, it is determined that the display is not to be finished, the process returns to step S41 and the subsequent steps are repeatedly performed. If, in step S48, it is determined that the display is to be finished, the process finishes.

In the above-described process, the CPU 23 controls GOP transfer from the memory 18 to the memory 25 and decoding by the decoder 26. In this case, an anchor frame of a GOP transferred to the memory 25 is preferentially decoded. Thus, a response from reception of the display command until output of baseband image data obtained by decoding can be improved.

Next, the transfer-unit determination process, executed in step S4 in FIG. 6, is described below with reference to the flowchart shown in FIG. 8.

In step S71, the transfer-unit determining unit 62 in the CPU 11 determines whether the frame to be displayed is one of two B pictures at the start of the GOP. If, in step S71, it is determined that the frame to be displayed is not one of two B pictures at the start of the GOP, the process proceeds to step S72, which is described later.

If, in step S71, it is determined that the frame to be displayed is one of two B pictures at the start of the GOP, in step S72, the transfer-unit determining unit 62 determines whether a GOP including the B picture is at the start of the stream, that is, whether the GOP including the B picture has no forward reference image. If, in step S72, it is determined that the GOP including the B picture is at the start of the stream, the process proceeds to step S74 (described later)

If, in step S72, it is determined that the GOP including the B picture is not at the start of the stream, in step S73, the transfer-unit determining unit 62 determines whether a forward GOP, that is, a GOP including a forward reference image for this B picture, has already been transferred. If, in step S73, it is determined that the forward GOP has not already been transferred, the process proceeds to step S76, which is described later.

If, in step S71, it is determined that the frame to be displayed is not one of the two B pictures at the start of the GOP, if, in step S72, it is determined that that the GOP including the B picture is at the start of the stream, or, if, in step S73, it is determined that the forward GOP has already been transferred, in step S74, the transfer-unit determining unit 62 determines whether a GOP including the frame to be displayed has already been transferred. If, in step S74, it is determined that the GOP including the frame to be displayed has already been transferred, the process returns to step S4 in FIG. 4 and proceeds to step S5.

If, in step S74, it is determined that the GOP including the frame to be displayed has not already been transferred, in step S75, the transfer-unit determining unit 62 controls initiation of transfer of the GOP including the frame to be displayed from the HDD 16 to the memory 18 through the south bridge 15, the north bridge 12, the PCI bus 14, and the PCI bridge 17. The process returns to step S4 in FIG. 6 and proceeds to step S5.

If, in step S73, it is determined that the forward GOP has not already been transferred, in step S76, the transfer-unit determining unit 62 determines whether the GOP including the B picture, that is, the GOP including the frame to be displayed, has already been transferred.

If, in step S73, it is determined that the GOP including the B picture has already been transferred, in step S77, the transfer-unit determining unit 62 controls initiation of transfer of the first forward GOP from the HDD 16 to the memory 18 through the south bridge 15, the north bridge 12, the PCI bus 14, and the PCI bridge 17. The process returns to step S4 in FIG. 6 and proceeds to step S5.

If, in step S73, it is determined that the GOP including the B picture has not already been transferred, in step S78, the transfer-unit determining unit 62 controls initiation of transfer of I2, B0, and B1 in the GOP to be displayed in addition to the first forward GOP through the south bridge 15, the north bridge 12, the PCI bus 14, and the PCI bridge 17. The process returns to step S4 in FIG. 6 and proceeds to step S5.

In the above process, when a picture to be displayed is one of two B pictures at the start of a GOP, and either of a GOP including the B picture and the first forward GOP (i.e., a GOP including a reference image frame necessary for decoding a B picture to be displayed) has not been transferred, the first forward GOP, and I2, B0, and B1 are transferred. Therefore, even if the currently executed playback process is a high speed playback process, and a different frame in the GOP including the B picture is not displayed, unnecessary data is prevented from being transferred. Furthermore, in a case in which, instead of the high speed playback process, in order for the different frame in the GOP including this B picture to be displayed, it is necessary to transfer the GOP including the B picture, the transferred data has reduced redundancy.

Next, a first transfer-timing determination process that is a first example of the transfer-timing determination process executed in step S5 in FIG. 6 is described below with reference to the flowchart shown in FIG. 9.

In step S101, the GOP transfer timing control unit 64 determines whether the frame to be displayed is included in the same GOP including a previously displayed frame. If, in step S101, it is determined that the frame to be displayed is not included in the same GOP including the previously displayed frame, the process returns to step S5 in FIG. 6 and proceeds to step S6.

If, in step S101, it is determined that the frame to be displayed is included in the same GOP including the previously displayed frame, in step S102, the GOP transfer timing control unit 64 determines whether the frame to be displayed is temporally backward from the previously displayed frame, that is, forward playback is performed. If, in step S102, it is determined that the frame to be displayed is temporally backward from the previously displayed frame, the process proceeds to step S106, which is described later.

If, in step S102, it is determined that the frame to be displayed is not temporally backward from the previously displayed frame, that is, reverse playback is performed, in step S103, the GOP transfer timing control unit 64 determines whether the frame to be displayed is within eight frames from the start of the GOP. If, in step S103, it is determined that the frame to be displayed is not within eight frames from the start of the GOP, the process returns to step S5 in FIG. 6 and proceeds to step S6.

If, in step S103, it is determined that the frame to be displayed is within eight frames from the start of the GOP, in step S104, the GOP transfer timing control unit 64 determines whether data of the first forward GOP is being transferred or has already been transferred. If, in step S104, it is determined that the data of the first forward GOP is being transferred or has already been transferred, the process returns to step S5 in FIG. 6 and proceeds to step S6.

If, in step S104, it is determined that data of the first forward GOP is not being transferred or has not already been transferred, in step S105, the GOP transfer timing control unit 64 controls initiation of transfer of the first forward GOP from the HDD 16 to the memory 18 through the south bridge 15, the north bridge 12, the PCI bus 14, and the PCI bridge 17. The process returns to step S5 in FIG. 6 and proceeds to step S6.

If, in step S102, it is determined that the frame to be displayed is temporally backward from the previously displayed frame, in step S106, the GOP transfer timing control unit 64 determines whether the frame to be displayed is within five frames from the end of the GOP. If, in step S106, it is determined that the frame to be displayed is not within five frames from the end of the GOP, the process returns to step S5 in FIG. 6 and proceeds to step S6.

If, in step S106, it is determined that the frame to be displayed is within five frames from the end of the GOP, in step S107, the GOP transfer timing control unit 64 determines whether data of the first backward GOP is being transferred or has already been transferred. If, in step S107, it is determined that the data of the first backward GOP is being transferred or has already been transferred, the process returns to step S5 in FIG. 6 and proceeds to step S6.

If, in step S107, it is determined that data of the first backward GOP is not being transferred or has not already been transferred, in step S108, the GOP transfer timing control unit 64 controls initiation of transfer of the first backward GOP from the HDD 16 to the memory 18 through the south bridge 15, the north bridge 12, the PCI bus 14, and the PCI bridge 17. The process returns to step S5 in FIG. 6 and proceeds to step S6.

In a case in which, in the above-described process, in forward playback, the next frame to be played back is within five frame from the end of the GOP, and, in reverse playback, the next frame to be played back is within eight frames from the start of the GOP, a GOP predicted to be next displayed is transferred. Thus, I and P pictures included in the GOP can be decoded. Accordingly, for an actual display command, a time that is taken to the end of decoding can be reduced.

As described above, the GOP transfer timing control unit 64 may use, as second timing different from first timing that is an intermediate point (within 5 frames from the end of a GOP in the case of forward playback and within 8 frames from the start of a GOP in the case of reverse playback) in a GOP including a frame being played back, a GOP-change point of the GOP including the frame being played back, and may transfer a GOP likely to be next transferred to the memory 18 in advance. When the GOP likely to be next transferred has not been transferred yet with the first timing that is an intermediate point of the GOP including the frame being played back, the GOP transfer timing control unit 64 initiates transfer of the GOP similarly to the above-described case.

Next, a second transfer-timing determination process that is a second example of the transfer-timing determination process executed in step S5 in FIG. 6 is described below with reference to the flowchart shown in FIG. 10.

In step S131, the GOP transfer timing control unit 64 determines whether the frame to be displayed is included in the same GOP including the previously displayed frame. If, in step S131, it is determined that the frame to be displayed is included in the same GOP including the previously displayed frame the process proceeds to step S132. If, in step S132, it is determined that the frame to be displayed is not included in the same GOP including the previously displayed frame, the process proceeds to step S139, which is described later.

In steps S132 to S138, processing that is basically similar to steps S102 to S108 in FIG. 9 is executed.

Specifically, if it is determined that the frame to be displayed is not temporally backward from the previously displayed frame, but is within eight frames from the start of the GOP, and data of the first forward GOP is not being transferred or has not already been transferred, initiation of transfer of the first forward GOP from the HDD 16 to the memory 18 is controlled. The process returns to step S5 in FIG. 6 and proceeds to step S6.

In addition, if it is determined that the frame to be displayed is temporally backward from the previously displayed frame, is within five frames from the end of the GOP, and data of the first backward GOP is not being transferred or has not already been transferred, transfer of the data of the first backward GOP is initiated, and the process returns to step S5 in FIG. 6 and proceeds to step S6.

If it is determined that the frame to be displayed is not within eight frames from the start of the GOP, if it is determined that data of the first forward is being transferred or has already been transferred, if it is determined that the frame to be displayed is not within five frames from the end of the GOP, or if it is determined that data of the first backward GOP is being transferred or has already been transferred, the process returns to step S5 in FIG. 6 and proceeds to step S6.

If, in step S131, it is determined that the frame to be displayed is not included in the same GOP including the previously displayed frame, in step S139, the GOP transfer timing control unit 64 determines whether the frame to be displayed is included in the first backward GOP from the GOP including the previously displayed frame, that is, whether the frame to be displayed is a GOP change point in forward playback. If, in step S139, it is determined that the frame to be displayed is not included in the first backward GOP from the GOP including the previously displayed frame, the process proceeds to step S141, which is described later.

If, in step S139, it is determined that the frame to be displayed is included in the first backward GOP from the GOP including the previously displayed frame, in step S140, the GOP transfer timing control unit 64 initiates transfer of the second backward GOP. The process returns to step S5 in FIG. 6 and proceeds to step S6.

If, in step S139, it is determined that the frame to be displayed is not included in the first backward GOP from the GOP including the previously displayed frame, in step S141, the GOP transfer timing control unit 64 determines whether the frame to be displayed is included in the first forward GOP from the GOP including the previously displayed frame, that is, whether the frame to be displayed is a GOP change point in reverse playback. If, in step S141, it is determined that the frame to be displayed is not included in the first forward GOP from the GOP including the previously displayed frame, the process returns to step S5 in FIG. 6 and proceeds to step S6.

If, in step S141, it is determined that the frame to be displayed is included in the first forward GOP from the GOP including the previously displayed frame, in step S142, the GOP transfer timing control unit 64 initiates transfer of the second forward GOP. The process returns to step S5 in FIG. 6 and proceeds to step S6.

In the above-described process, transfer of a GOP predicted to be next displayed can be initiated at a GOP change point used as the second timing different from the first timing (within 5 frames from the end of a GOP in the case of forward playback and within 8 frames from the start of a GOP in the case of reverse playback). Thus, a display response can be prevented from deteriorating due to a delay in transfer of frame data.

In addition, when transfer of a GOP likely to be next played back is initiated with the second timing, priority for the data transfer may be lowered than that for the display command or the like. At this time, even if transfer of the GOP likely to be next played back is initiated with the second timing, or even if transfer of the GOP likely to be next played back is initiated with the first timing, it is preferable that the transfer-completion command be transmitted with the first timing because data is prevented from being transmitted in advance to the memory 25 more than necessary.

In other words, compared with the processing for transmitting a command, such as a display command, and the processing for transferring a GOP likely to be played back next to a GOP including a currently played-back frame, the processing for transferring data in advance at the GOP change point has no urgency since, in the processing, data likely to be used is transferred beforehand. Thus, by giving priority, efficiency of data transfer, such as command transmission, can be improved without deteriorating processing necessary for displaying video.

Next, a second process of the CPU 11 is described below with reference to the flowchart shown in FIG. 11. The second process of the CPU 11 is executed in a case in which, with a GOP change point used as the second timing, a GOP likely to be next transferred is transferred to the memory 18 in advance and priority of the transfer is lowered, and in which the transfer-completion command is set to be transmitted with the first timing that plays back a frame within 5 frames from the end of a GOP in the case of forward playback and within 8 frames from the start of a GOP in the case of reverse playback.

In steps S171 to S174, processing that is basically similar to that in steps S1 to S4 is executed.

In other words, a user's operation input supplied from the operation input unit 21 through the south bridge 15 and the north bridge 12 is received and a frame display order is scheduled. A frame to be displayed is specified and a GOP to be transferred to the memory 18 is determined. After that, the transfer-unit determination process described with reference to FIG. 8 is executed.

Figure 12:
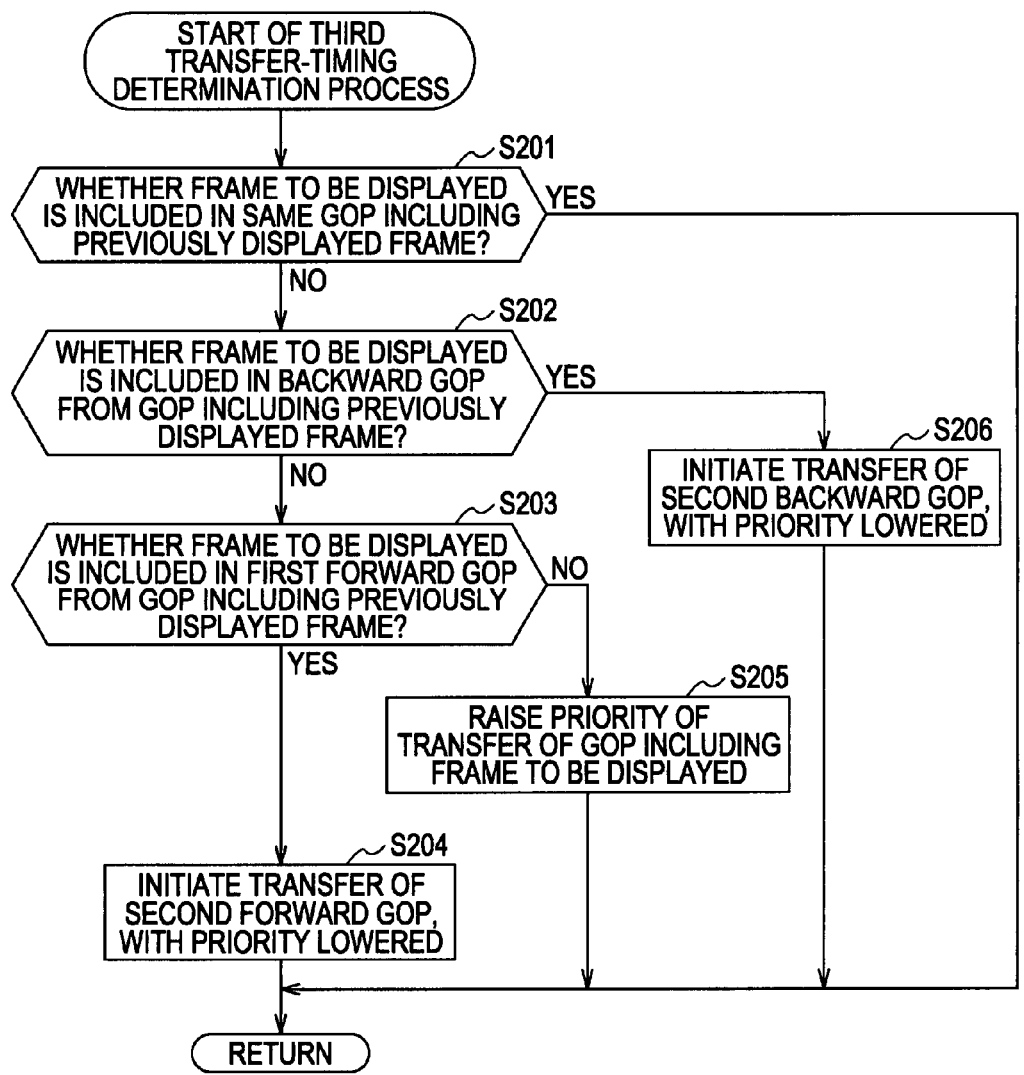
FIG. 12 is a flowchart illustrating a third transfer-timing determination process.

In step S175, a third transfer-timing determination process, described with reference to the flowchart shown in FIG. 12, is executed.

Figure 13:
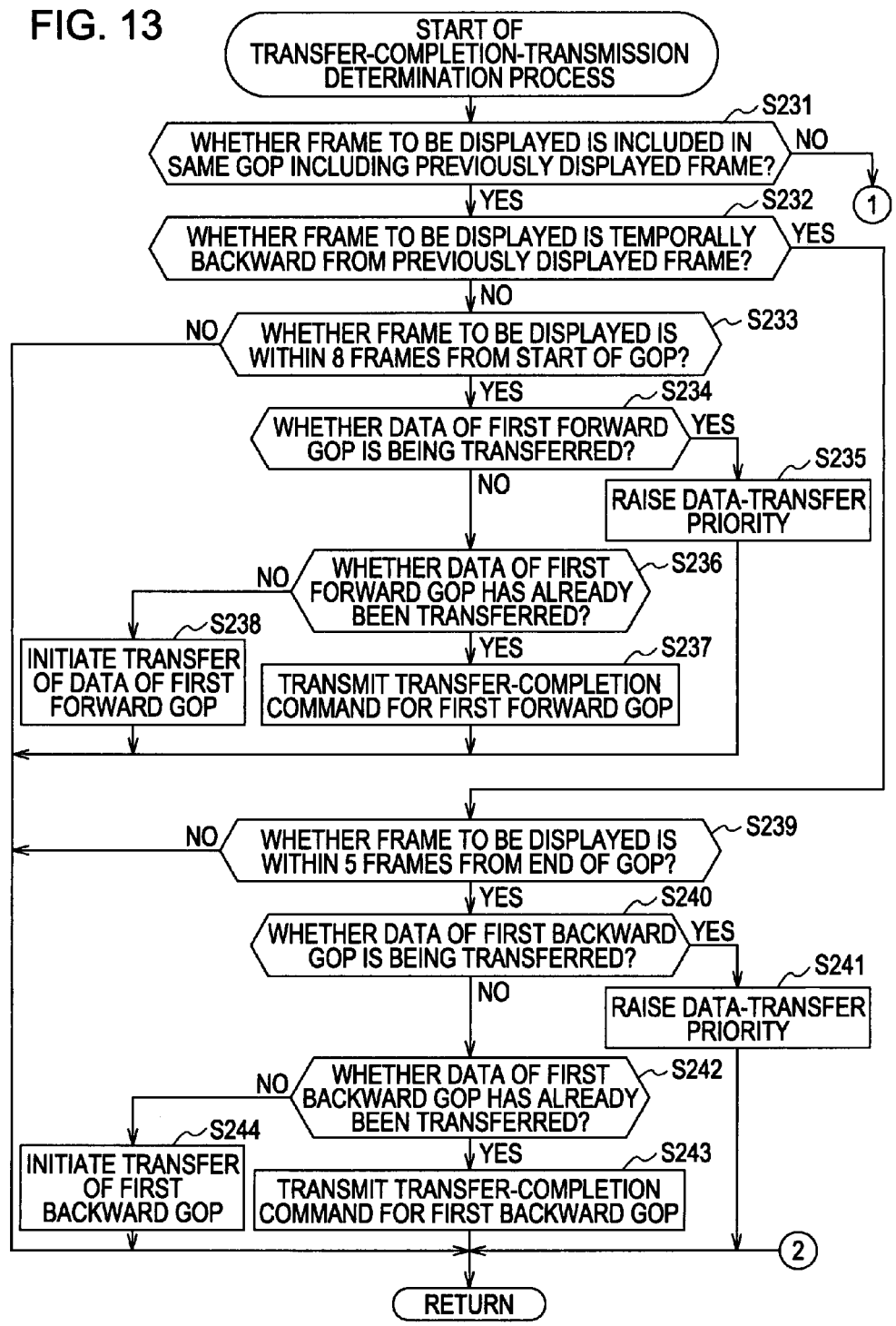
FIG. 13 is a flowchart illustrating a transfer-completion-transmission determination process.

In step S176, a transfer-completion-transmission determination process, described with reference to the flowchart shown in FIG. 13, is executed.

In steps S177 to S179, processing that is basically similar to that in steps S9 to S11 described with reference to FIG. 6, is executed before the process finishes.

In other words, a display command to display a frame to be next displayed is transmitted, and, on the basis of a user's operation input, it is determined whether an operation including an alteration in frame display order, such as a change in position of the display-frame-position specifying line 42 described with reference to FIG. 2, or a change in stream to be displayed, has been input from the user. If it is determined that the operation including the alteration in frame display order has been input, the process returns to step S172 and the subsequent steps are repeatedly performed.

If it is determined that the operation including the alteration in frame display order has not been input, on the basis of a signal representing the operation input, it is determined whether display is to be finished. If it is determined that the display is not to be finished, the process returns to step S173 and the subsequent steps are repeatedly performed. If it is determined that the display is to be finished, the process finishes.

In the above processing, at a GOP change point, the GOP likely to be next transferred is transferred to the memory 18 in advance and priority of the transfer is lowered. The transfer-completion command is transmitted with timing that plays back a frame within 5 frames from the end of a GOP in the case of forward playback and within 8 frames from the start of a GOP in the case of reverse playback. This can prevent the display response from deteriorating due to a delay in transfer of frame data. In addition, in cases such as when the playback direction is changed since much data is transferred to the memory 25 in advance, the memory 25 can be prevented from overflowing and decoding can be prevented from being delayed.

Figure 11:
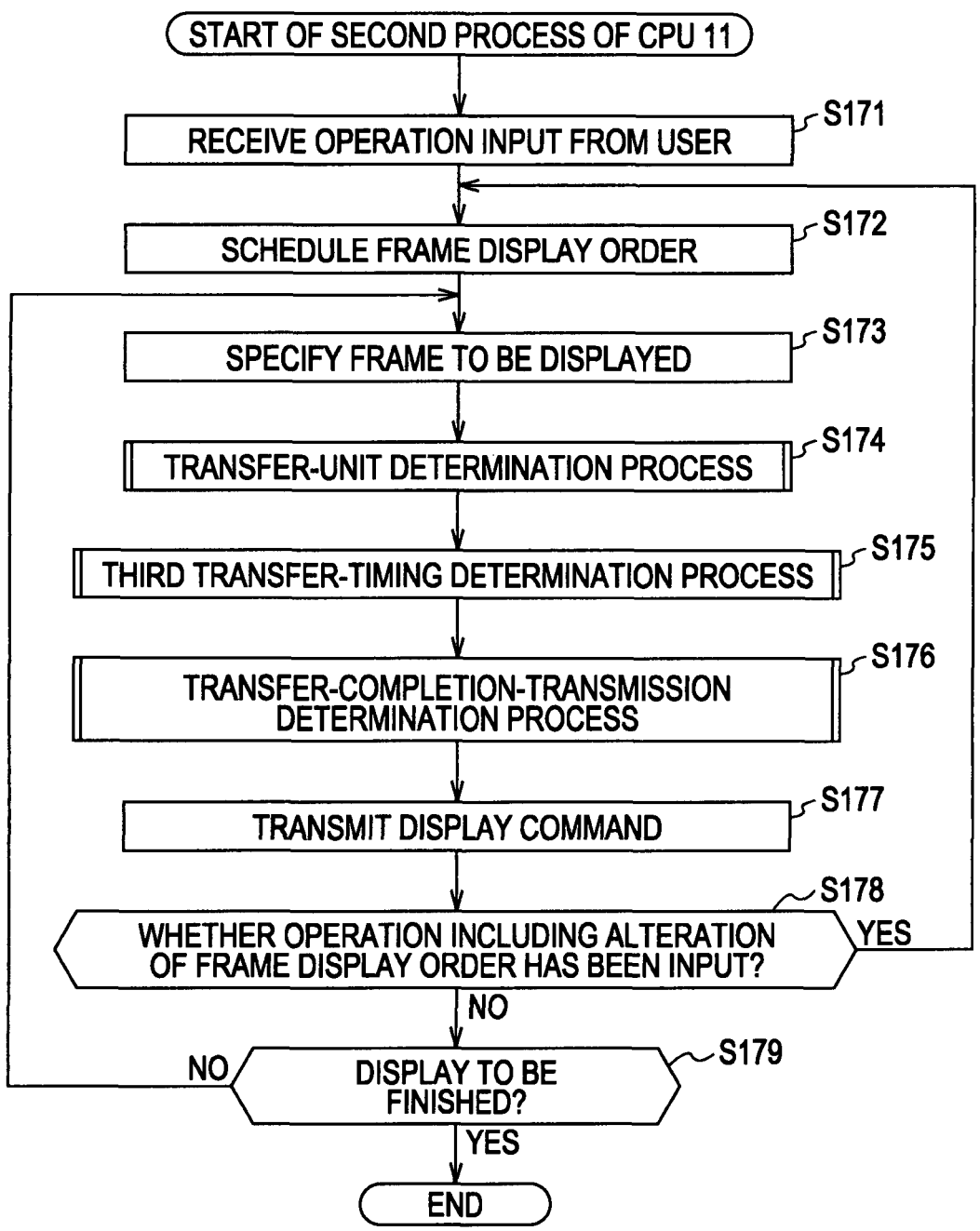
FIG. 11 is a flowchart illustrating a second process of the CPU 11 shown in FIG. 1.

A process that is executed by the CPU 23 in parallel with the process described with reference to the flowchart shown in FIG. 11 is similar to that described with reference to FIG. 7. Accordingly, the process by the CPU 23 is not described.

Next, the third transfer-timing determination process that is executed in step S175 in FIG. 11 is described with reference to the flowchart shown in FIG. 12.

In step S201, the GOP transfer timing control unit 64 determines whether the frame to be displayed is included in the same GOP including the previously displayed frame. If, in step S201, it is determined that the frame to be displayed is included in the same GOP including the previously displayed frame, the process returns to step S175 and proceeds to step S176.

If, in step S201, it is determined that the frame to be displayed is not included in the same GOP including the previously displayed frame, in step S202, the GOP transfer timing control unit 64 determines whether the frame to be displayed is included in the first backward GOP from the GOP including the previously displayed frame, that is, whether the frame to be displayed is a GOP change point in forward playback. If, in step S202, it is determined that the frame to be displayed is included in the first backward GOP from the GOP including the previously displayed frame, the process proceeds to step S206, which is described later.

If, in step S202, it is determined that the frame to be displayed is not included in the first backward GOP from the GOP including the previously displayed frame, in step S203, the GOP transfer timing control unit 64 determines whether the frame to be displayed is included in the first forward GOP from the GOP including the previously displayed frame, that is, whether the frame to be displayed is a GOP change point in reverse playback.

If, in step S203, it is determined that the frame to be displayed is included in the first forward GOP, in step S204, the GOP transfer timing control unit 64 lowers transfer priority, and initiates transfer of the second forward GOP from the HDD 16 to the memory 18 through the south bridge 15, the north bridge 12, the PCI bus 14, and the PCI bridge 17. The process returns to step S175 in FIG. 11 and proceeds to step S176.

If, in step S203, it is determined that the frame to be displayed is not included in the first forward GOP, that is, it is determined that the frame to be displayed is not included before and after the previously displayed frame, in step S205, the GOP transfer timing control unit 64 raises priority of transfer of the GOP being transferred and including the frame to be displayed. The process returns to step S175 in FIG. 11 and proceeds to step S176.

If, in step S202, it is determined that the frame to be displayed is included in the first backward GOP, in step S206, with the transfer priority raised, the GOP transfer timing control unit 64 initiates transfer of the second backward GOP from the HDD 16 to the memory 18 through the south bridge 15, the north bridge 12, the PCI bus 14, and the PCI bridge 17. The process returns to step S175 in FIG. 11 and proceeds to step S176.

In this process, with the GOP change point used as the second timing, the GOP likely to be next transferred is transferred further in advance and priority of the transfer can be lowered.

Figure 14:
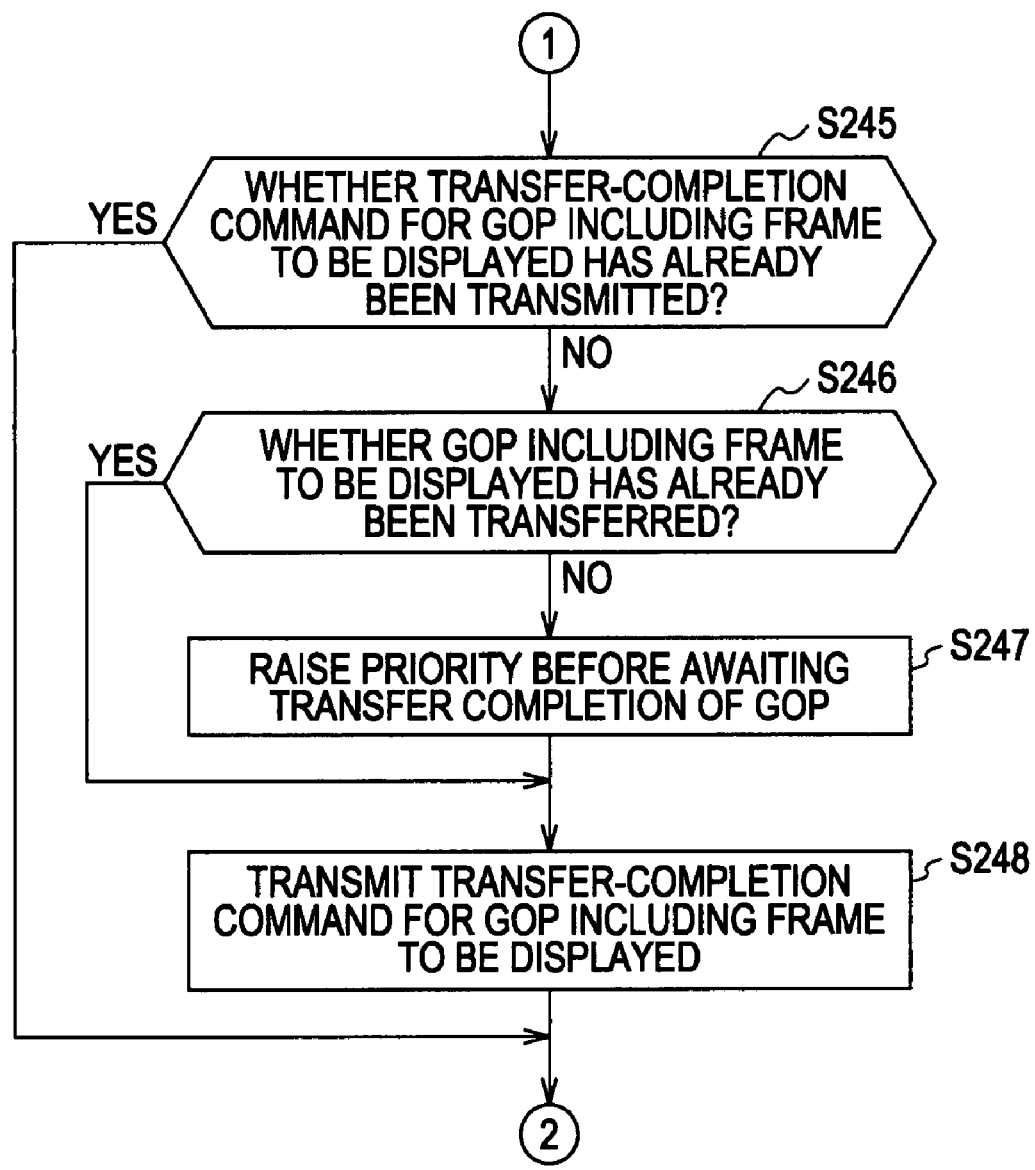
FIG. 14 is a flowchart illustrating transfer-completion-transmission determination process.

Next, the transfer-completion-transmission determination process that is executed in step S176 in FIG. 11 is described below with reference to the flowcharts shown in FIGS. 13 and 14.

In step S231, the GOP transfer timing control unit 64 determines whether the frame to be displayed is included in the same GOP including the previously displayed frame. If, in step S231, it is determined that the frame to be displayed is not included in the same GOP including the previously displayed frame, the process proceeds to step S245, which is described later.

If, in step S231, it is determined that the frame to be displayed is included in the same GOP including the previously displayed frame, in step S232, the GOP transfer timing control unit 64 determines whether the frame to be displayed is temporally backward from the previously displayed frame. If, in step S232, it is determined that the frame to be displayed is temporally backward from the previously displayed frame, the process proceeds to step S239, which is described later.

If, in step S232, it is determined that the frame to be displayed is not temporally backward from the previously displayed frame, in step S233, the GOP transfer timing control unit 64 determines whether the frame to be displayed is within eight frames from the start of the GOP. If, in step S233, it is determined that the frame to be displayed is not within eight frames from the start of the GOP, the process returns to step S176 in FIG. 11 and proceeds to step S177.

If, in step S233, it is determined that the frame to be displayed is within eight frames from the start of the GOP, in step S234, the GOP transfer timing control unit 64 determines whether the first forward GOP is being transferred.

If, in step S234, it is determined that the first forward GOP is being transferred, in step S235, the GOP transfer timing control unit 64 raises priority of data transfer of the first forward GOP. The process returns to step S176 in FIG. 11 and proceeds to step S177.

If, in step S234, it is determined that the first forward GOP is not being transferred, in step S236, the GOP transfer timing control unit 64 determines whether the first forward GOP has already been transferred.

If, in step S236, it is determined that the first forward GOP has already been transferred, in step S237, the GOP transfer timing control unit 64 commands the transfer-completion-command sending unit 65 to transmit a transfer-completion command concerning the first forward GOP. The transfer-completion-command sending unit 65 transmits the transfer-completion command concerning the first forward GOP to the command buffer 31 of the PCI bridge 17 through the north bridge 12 and the PCI bus 14. The process returns to step S176 in FIG. 11 and proceeds to step S177.

If, in step S236, it is determined that the first forward GOP has not already been transferred, in step S238, the GOP transfer timing control unit 64 controls initiation of transfer of the first forward GOP from the HDD 16 to the memory 18 through the south bridge 15, the north bridge 12, the PCI bus 14, and the PCI bridge 17. The process returns to step S176 in FIG. 11 and proceeds to step S177. At this time, the priority of transfer of the first forward GOP is set to be high equivalently to that of the transfer-completion command.

If, in step S232, it is determined that the frame to be displayed is temporally backward from the previously displayed frame, in step S239, the GOP transfer timing control unit 64 determines whether the frame to be displayed is within five frames from the end of the GOP. If, in step S239, it is determined that the frame to be displayed is not within five frames from the end of the GOP, the process returns to step S176 in FIG. 11 and proceeds to step S177.

If, in step S239, it is determined that the frame to be displayed is within five frames from the end of the GOP, in step S240, the GOP transfer timing control unit 64 determines whether data of the first backward GOP is being transferred.

If, in step S240, it is determined that the data of the first backward GOP is being transferred, in step S241, the GOP transfer timing control unit 64 raises the priority of transfer of the first backward GOP being transferred. The process returns to step S176 in FIG. 11 and proceeds to step S177.

If, in step S240, it is determined that the data of the first backward GOP is not being transferred, in step S242, the GOP transfer timing control unit 64 determines whether the data of the first backward GOP has already been transferred.

If, in step S242, it is determined that the data of the first backward GOP has already been transferred, in step S243, the GOP transfer timing control unit 64 commands the transfer-completion-command sending unit 65 to transmits a transfer-completion command concerning the first backward GOP. The transfer-completion-command sending unit 65 transmits the transfer-completion command concerning the first backward GOP to the command buffer 31 of the PCI bridge 17 through the north bridge 12 and the PCI bus 14. The process returns to step S176 in FIG. 11 and proceeds to step S177.

If, in step S242, it is determined that the data of the first backward GOP has not already been transferred, in step S244, the GOP transfer timing control unit 64 controls initiation of transfer of the first backward GOP from the HDD 16 to the memory 18 through the south bridge 15, the north bridge 12, the PCI bus 14, and the PCI bridge 17. The process returns to step S176 in FIG. 11 and proceeds to step S177. At this time, the transfer priority of the first backward GOP is set to be high equivalently to that of the transfer-completion command or the like.

If, in step S231, it is determined that the frame to be displayed is not included in the same GOP including the previously displayed frame, in step S245, it is determined whether the GOP transfer timing control unit 64 has already commanded the transfer-completion-command sending unit 65 to transmit a transfer-completion command concerning the GOP including the frame to be displayed, that is, it is determined whether the transfer-completion-command sending unit 65 has transmitted the transfer-completion command concerning the GOP including the frame to be displayed. If, in step S245, it is determined that the transfer-completion command concerning the GOP including the frame to be displayed has been transmitted, the process returns to step S176 in FIG. 11 and proceeds to step S177.

If, in step S245, it is determined that the transfer-completion command concerning the GOP including the frame to be displayed has not been transmitted, in step S246, the GOP transfer timing control unit 64 determines whether data of the GOP including the frame to be displayed has already been transferred.

If, in step S246, it is determined that the data of the GOP including the frame to be displayed has not already been transferred, in step S247, the GOP transfer timing control unit 64 raises transfer priority of the GOP including the frame to be displayed, and waits for the GOP transfer to be completed.

If, in step S246, it is determined that the data of the GOP including the frame to be displayed has already been transferred, or after step S247 finishes, in step S248, the GOP transfer timing control unit 64 commands the transfer-completion-command sending unit 65 to transmits a transfer-completion command concerning the GOP including the frame to be displayed. The transfer-completion-command sending unit 65 transmits the transfer-completion command concerning the GOP including the frame to be displayed to the command buffer 31 of the PCI bridge 17 through the north bridge 12 and the PCI bus 14. The process returns to step S176 in FIG. 11 and proceeds to step S177.

In this process, regardless actual GOP transfer timing, a transfer-completion command concerning data is transmitted with the first timing that plays back a frame within 5 frames from the end of a GOP in the case of forward playback and within 8 frames from the start of a GOP in the case of reverse playback.

By executing the above-described processing, a response of decoding of LONG GOP compressed video data can be improved without providing a mass storage frame memory, scrub playback and forward/reverse frame-advance playback can easily be controlled at high speed.

A case in which MPEG is used as CODEC processing has been exemplified. However, obviously, the present invention is applicable to a case in which CODEC processing using frame correlation is performed. For example, the present invention is applicable to AVC/H.264 (Advanced Video Coding/H.264), etc.

A B picture in AVC/H.264 may not use bidirectional (forward and backward) reference images. Prediction may be performed by using two reference images in the past, and prediction may be performed by using two reference images in the future. Considering this case, an embodiment of the present invention can be applied. By applying an embodiment of the present invention, intervals in which false quantization matrices are used to perform decoding can be reduced, thus suppressing deterioration in image.

A B picture in AVC/H.264 may not use bidirectional (forward and backward) reference images. Prediction may be performed by using two reference images in the past, and prediction may be performed by using two reference images in the future. Considering this case, an embodiment of the present invention can be applied.

In the foregoing description, the CPUs 11 and 20 exchange control information through the command buffer 31 and result buffer 32 in the PCI bridge 17 and share control. However, for example, such processing may be executed by a single CPU.

Figure 15:
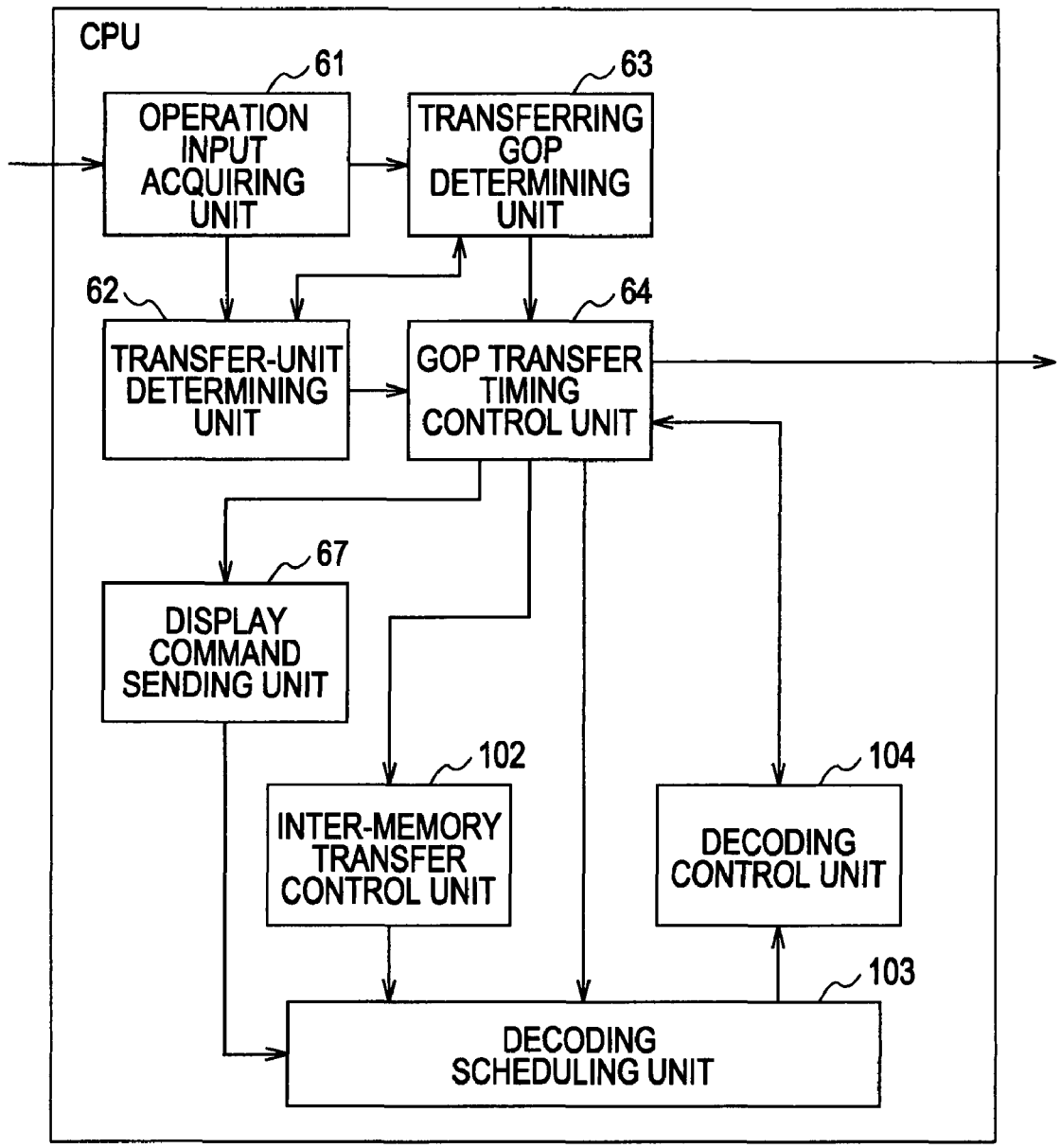
FIG. 15 is a functional block diagram illustrating CPU functions.

In this case, as shown by the functional block diagram of FIG. 15, the functions of the CPU are basically similar to the operation input acquiring unit 61, the transfer-unit determining unit 62, the transfer-unit determining unit 63, the GOP transfer timing control unit 64, the transfer-completion-command sending unit 65, the display command sending unit 67, the inter-memory transfer control unit 102, the decoding scheduling unit 103, and the decoding control unit 104, which are described with reference to FIG. 3.

The above-described consecutive processing may be executed by software. The software is installed from a recording medium into a computer in which programs constituting the software are embedded in dedicated hardware, or, for example, a multipurpose personal computer system that can execute various functions by installing various programs into the system.

Figure 16:
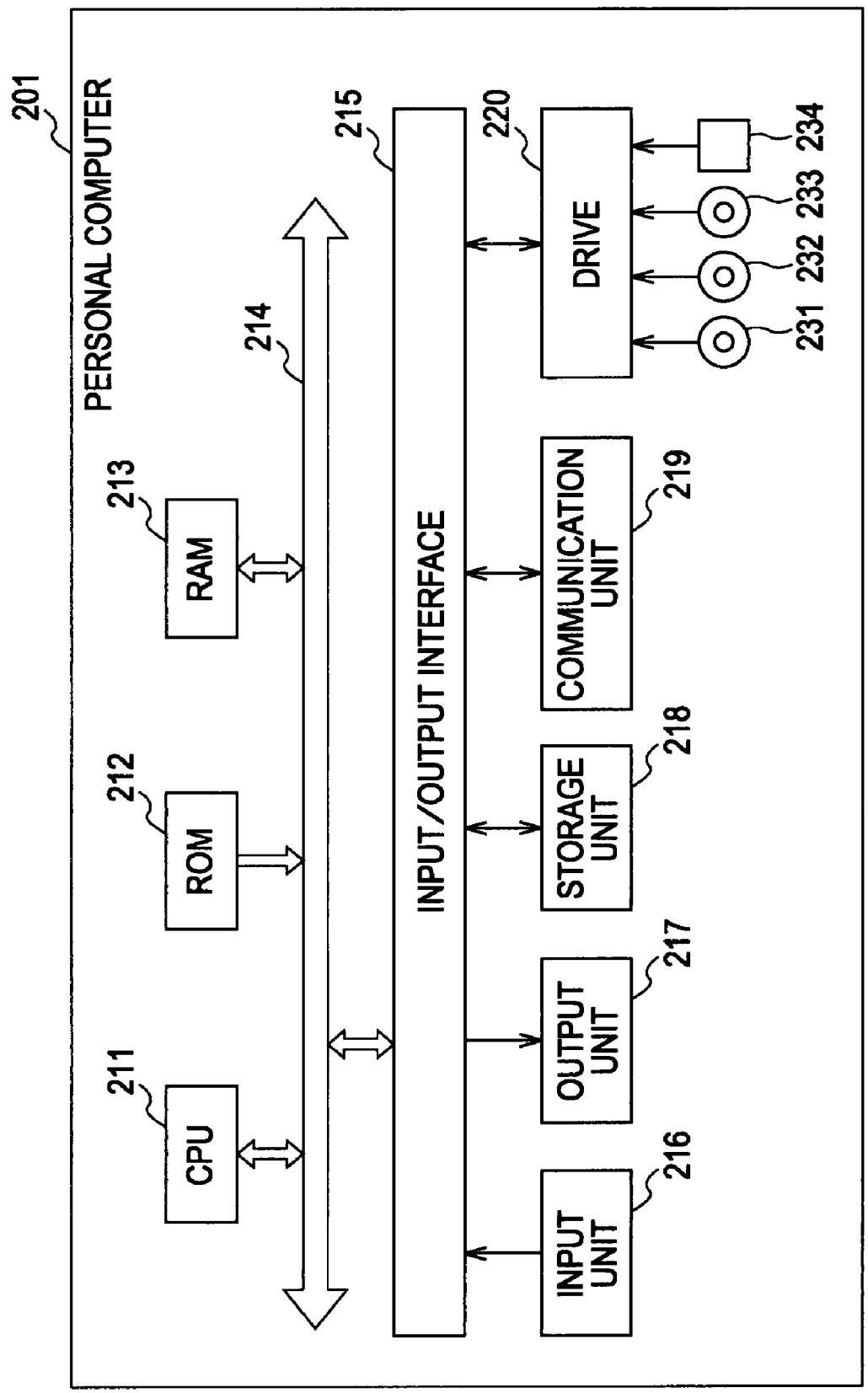
FIG. 16 is a block diagram showing the configuration of a personal computer.

Referring to FIG. 16, a CPU 201 executes various processes in accordance with a program stored in a ROM (read-only memory) 212 or a program loaded from a storage unit 218 into a RAM (random access memory) 213. The RAM 213 also stored data or the like that is necessary for the CPU 211 to execute various processes, if necessary.

The CPU 211, the ROM 212, and the RAM 213 are connected to one another by an internal bus 214. The internal bus 214 connects to an input/output interface 215.

The input/output interface 215 connects to an input unit 216 including a keyboard and a mouse, an output unit 217 including a display formed by a cathode-ray tube or liquid crystal display, and a speaker, a storage unit 218 including a hard disk, and a communication unit 219 including a modem and a terminal adapter. The communication unit 219 performs communicating processing using various networks including a telephone line and a CATV (community antenna television).

The input/output interface 215 also connects to a drive 220, if necessary. A magnetic disk 231 (including a flexible disk), an optical disc 232 (including a CD-ROM (compact-disc read-only memory) and a DVD (digital versatile disc)), a magneto-optical disc 233 (including a MiniDisk), or a semiconductor memory 234, is loaded into the drive 220, if necessary. A computer program is read from the medium and is installed into the storage unit 218, if necessary.

When software is used to execute the above-described consecutive processing, a program included in the software is installed from a network or a recording medium.

As shown in FIG. 16, this recording medium includes a program-recorded package medium which is distributed in order to provide a program to the user separately from the computer and which includes the magnetic disk 231, the optical disc 232, the magneto-optical disc 233, or the semiconductor memory 234.

In addition, in this specification, the steps constituting the program recorded on the recording medium include not only steps that are executed in a time-series manner in given order, but also steps which are executed in parallel or separately if they may not be executed in a time-series manner.

The above-described embodiment describes a case in which compressed stream data is stored in the HDD 16. However, an embodiment of the present invention is not limited to such a case and can be applied to even the case of decoding stream data recorded in each of recording media such as an optical disc, a magneto-optical disc, a semiconductor memory, or a magnetic disk.

In this specification, the system represents the entirety of an apparatus including a plurality of devices.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus for decoding a coded stream, comprising:
    a memory for storing the coded stream;
    a decoder for generating image data by decoding the coded stream stored in the memory;
    a transfer timing control unit for controlling transfer so that the coded stream is transferred to the memory prior to timing for outputting the image data; and
    a decoding scheduling unit for controlling decoding by the decoder so that, in the coded stream stored in the memory, a reference picture that is referred to in picture decoding is preferentially decoded.

2. The information processing apparatus according to claim 1, further comprising a decoding control unit for commanding the timing for outputting the image data.

3. The information processing apparatus according to claim 2, further comprising a transfer-unit determining unit for determining transfer units of transfer to the memory for the coded stream whose transfer is controlled by the transfer timing control unit.

4. The information processing apparatus according to claim 3, wherein:
    the coded stream includes groups of pictures including B pictures; and
    when a picture based on the image data whose output timing is commanded by the decoding control unit is included in a B picture that is decoded by referring to a picture included in a second group of pictures different from a first group of pictures including the picture based on the image data, the transfer-unit determining unit determines, as the transfer units of transfer to the memory, the B picture that is decoded by referring to the second group of pictures, a reference picture that is referred to when the B picture is decoded, and the second group of pictures.

5. The information processing apparatus according to claim 3, wherein:
    the coded stream includes groups of pictures including B pictures; and
    when each of a first group of pictures including a picture based on the image data whose output timing is commanded by the decoding control unit and a second group of pictures different from the first group of pictures is not transferred to the memory means, the transfer-unit determining unit determines, as the transfer units of transfer to the memory, a B picture that is referred to by referring to a picture included in the second group of pictures, a reference picture that is referred to when the B picture is decoded, and the second group of pictures.

6. The information processing apparatus according to claim 2, wherein:
    the coded stream includes groups of pictures including X frames; and when a command to output the image data by the decoding control unit represents reverse output for an arrangement in the coded stream, and a picture based on the image data whose output timing is commanded by the decoding control unit is positioned within Z frames from the start of one group of pictures, where 0<Z<X, the transfer timing control unit controls the transfer to the memory for a group of pictures predicted to include a picture based on the image data, whose output timing is next commanded by the decoding control unit.

7. The information processing apparatus according to claim 6, wherein when a command by the decoding control unit represents forward output for an arrangement in the coded stream, a picture based on the image data whose output timing is commanded by the decoding control unit is positioned within Y frames from the end of one group of pictures, and wherein the transfer timing control unit controls the transfer to the memory means so that Z>Y.

8. The information processing apparatus according to claim 2, wherein the transfer timing control unit controls the transfer to the memory so that the coded stream is transferred in predetermined transfer units with second timing earlier than first timing, and, when the transfer to the memory is not controlled, controls the transfer to the memory so that the coded stream is transferred in the predetermined transfer units.

9. The information processing apparatus according to claim 8, wherein priority for transfer of the coded stream which is controlled so that transfer is initiated with the first timing is set by the transfer timing control unit to be higher than priority for transfer of the coded stream which is controlled so that transfer is initiated with the second timing.

10. The information processing apparatus according to claim 8, wherein:
the coded stream includes groups of pictures including X frames; and
in the first timing, a command to output the image data by the decoding control unit represents forward output for an arrangement in the coded stream, and a picture based on the image data whose output timing is commanded by the decoding control unit is positioned within Y frames from the end of one group of pictures, where 0<Y<X.

11. The information processing apparatus according to claim 10, wherein:
the coded stream includes groups of pictures including X frames; and
in the first timing, a command to output the image data by the decoding control unit represents reverse output for an arrangement in the coded stream, and a picture based on the image data whose output timing is commanded by the decoding control unit is positioned within Z frames from the start of the group of pictures, where 0<Z<X.

12. The information processing apparatus according to claim 2, further comprising:
a second memory for buffering the coded stream whose transfer is controlled by the transfer timing control unit before the coded stream is decoded;
an inter-memory transfer control unit for controlling transfer of the coded stream from the memory to the second memory; and
a transfer-completion-command sending unit for outputting, to the inter-memory transfer control unit, a control signal permitting transfer of the coded stream from the memory to the second memory.

13. The information processing apparatus according to claim 12, wherein:
the transfer timing control unit performs control so that the coded stream is transferred in predetermined transfer units with second timing earlier than predetermined first timing; and
the transfer-completion-command sending unit performs control so that the control signal is output to the inter-memory transfer control unit with the first timing.

14. The information processing apparatus according to claim 13, wherein priority for outputting the control signal to the inter-memory transfer control unit with the first timing is higher than priority for transfer of the coded stream to the memory with the second timing.

15. The information processing apparatus according to claim 13, wherein:
the coded stream includes groups of pictures including X frames; and
in the first timing, a command to output the image data by the decoding control unit represents forward output for an arrangement in the coded stream, and a picture based on the image data whose output timing is commanded by the decoding control unit is positioned within Y frames from the end of one group of pictures, where 0<Y<X.

16. The information processing apparatus according to claim 15, wherein:
the coded stream includes groups of pictures including X frames; and
in the second timing, a picture based on the image data whose output timing is commanded by the decoding control unit is included in a group of pictures different from a group of pictures including a picture based on the image data, whose output timing is previously commanded by the decoding control unit.

17. The information processing apparatus according to claim 13, wherein:
the coded stream includes groups of pictures including X frames; and
in the first timing, a command to output the image data by the decoding control unit represents reverse output for an arrangement in the coded stream, and a picture based on the image data whose output timing is commanded by the decoding control unit is positioned within Z frames from the start of the group of pictures, where 0<Z<X.

18. The information processing apparatus according to claim 2, wherein:
the coded stream includes groups of pictures including X frames; and
when a command by the decoding control unit represents forward output for an arrangement in the coded stream, and a picture based on the image data whose output timing is commanded by the decoding control unit is positioned within Y frames from the end of one group of pictures, where 0<Y<X, the transfer timing control unit controls the transfer to the memory for a group of pictures predicted to include a picture based on the image data, whose output timing is next commanded by the decoding control unit.

19. The information processing apparatus according to claim 1, wherein the coded stream is a stream coded in accordance with a Moving Picture Experts Group standard.

20. An information processing method for decoding a coded stream, the information processing method comprising the steps of:

storing the coded stream in a memory;
generating image data by decoding the coded stream stored in the memory;
controlling transfer so that the coded stream is transferred to the memory prior to timing for outputting the image data; and
controlling decoding so that, in the coded stream stored in the memory, a reference picture that is referred to in picture decoding is preferentially decoded.

* * * * *